United States Patent
Reed et al.

(10) Patent No.: US 9,801,248 B2
(45) Date of Patent: Oct. 24, 2017

(54) APPARATUS AND METHOD OF OPERATING A LUMINAIRE

(71) Applicant: Express Imaging Systems, LLC, Renton, WA (US)

(72) Inventors: William G. Reed, Seattle, WA (US); Dale H. DeGraff, Brier, WA (US); Richard Dolf, Seattle, WA (US)

(73) Assignee: Express Imaging Systems, LLC, Renton, WA (US)

( * ) Notice: Subject to any disclaimer, the term of this patent is extended or adjusted under 35 U.S.C. 154(b) by 262 days.

(21) Appl. No.: 14/816,754

(22) Filed: Aug. 3, 2015

(65) Prior Publication Data

US 2016/0037605 A1    Feb. 4, 2016

Related U.S. Application Data

(63) Continuation of application No. 13/558,191, filed on Jul. 25, 2012, now Pat. No. 9,131,552.

(51) Int. Cl.
*H05B 37/02* (2006.01)
*H05B 33/08* (2006.01)

(52) U.S. Cl.
CPC ..... *H05B 33/0854* (2013.01); *H05B 33/0884* (2013.01); *H05B 37/0218* (2013.01); *H05B 37/0281* (2013.01); *Y02B 20/42* (2013.01); *Y02B 20/46* (2013.01); *Y02B 20/72* (2013.01)

(58) Field of Classification Search
CPC ............ H05B 33/0854; H05B 33/0884; H05B 37/021; H05B 37/0218; H05B 37/0281; Y02B 20/40; Y02B 20/42; Y02B 20/46

USPC ................. 315/149–152, 291, 294, 297, 307
See application file for complete search history.

(56) References Cited

U.S. PATENT DOCUMENTS

| | | | |
|---|---|---|---|
| 2,240,050 | A | 4/1941 | Nuebling |
| 2,745,055 | A | 5/1956 | Woerdemann |
| 3,374,396 | A | 3/1968 | Bell et al. |
| 4,153,927 | A | 5/1979 | Owens |

(Continued)

FOREIGN PATENT DOCUMENTS

| | | |
|---|---|---|
| CN | 103162187 A | 6/2013 |
| DE | 40 01 980 | 8/1990 |

(Continued)

OTHER PUBLICATIONS

Extended European Search Report, dated Apr. 11, 2016, for corresponding European Application No. 16152644.7, 8 pages.

(Continued)

*Primary Examiner* — Jason M Crawford
(74) *Attorney, Agent, or Firm* — Seed IP Law Group LLP

(57) ABSTRACT

An illumination system verifies whether one or more aspects of an output signal provided by a photosensitive transducer fall within a threshold of an expected value for the aspect. The aspect may include a sunrise time, a sunset time, a dawn time, a dusk time, a solar noon time, a solar midnight time, or similar. Upon verification the illumination system uses a microcontroller to adjust one or more output parameters of a solid-state light source responsive to the output signal provided by the photosensitive transducer. Where verification is not possible, the illumination system uses the microcontroller to adjust one or more output parameters of the solid-state light source responsive to a schedule.

28 Claims, 11 Drawing Sheets

(56) References Cited

U.S. PATENT DOCUMENTS

| | | |
|---|---|---|
| 4,237,377 A | 12/1980 | Sansum |
| 4,663,521 A | 5/1987 | Maile |
| 5,086,379 A | 2/1992 | Denison et al. |
| 5,160,202 A | 11/1992 | Légaré |
| 5,161,107 A | 11/1992 | Mayeaux et al. |
| 5,230,556 A | 7/1993 | Canty et al. |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,561,351 A | 10/1996 | Vrionis et al. |
| 5,589,741 A | 12/1996 | Terman et al. |
| 5,808,294 A | 9/1998 | Neumann |
| 5,838,226 A | 11/1998 | Houggy et al. |
| 5,869,960 A | 2/1999 | Brand |
| 5,892,331 A | 4/1999 | Hollaway |
| 5,892,335 A | 4/1999 | Archer |
| 5,936,362 A | 8/1999 | Alt et al. |
| 6,111,739 A | 8/2000 | Wu et al. |
| 6,149,283 A | 11/2000 | Conway et al. |
| 6,154,015 A | 11/2000 | Ichiba |
| 6,160,353 A | 12/2000 | Mancuso |
| 6,377,191 B1 | 4/2002 | Takubo |
| 6,612,720 B1 | 9/2003 | Beadle |
| 6,674,060 B2 | 1/2004 | Antila |
| 6,681,195 B1 | 1/2004 | Poland et al. |
| 6,746,274 B1 | 6/2004 | Verfuerth |
| 6,753,842 B1 | 6/2004 | Williams et al. |
| 6,828,911 B2 | 12/2004 | Jones et al. |
| 6,841,947 B2 | 1/2005 | Berg-johansen |
| 6,880,956 B2 | 4/2005 | Zhang |
| 6,902,292 B2 | 6/2005 | Lai |
| 6,985,827 B2 | 1/2006 | Williams et al. |
| 7,019,276 B2 | 3/2006 | Cloutier et al. |
| 7,066,622 B2 | 6/2006 | Alessio |
| 7,081,722 B1 | 7/2006 | Huynh et al. |
| 7,122,976 B1 | 10/2006 | Null et al. |
| 7,188,967 B2 | 3/2007 | Dalton et al. |
| 7,190,121 B2 | 3/2007 | Rose et al. |
| 7,218,056 B1 | 5/2007 | Harwood |
| 7,239,087 B2 | 7/2007 | Ball |
| 7,270,441 B2 | 9/2007 | Fiene |
| 7,281,820 B2 | 10/2007 | Bayat et al. |
| 7,294,973 B2 | 11/2007 | Takahama et al. |
| 7,317,403 B2 | 1/2008 | Grootes et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Null et al. |
| 7,440,280 B2 | 10/2008 | Shuy |
| 7,547,113 B2 | 6/2009 | Lee |
| 7,559,674 B2 | 7/2009 | He et al. |
| 7,564,198 B2 | 7/2009 | Yamamoto et al. |
| 7,569,802 B1 | 8/2009 | Mullins |
| 7,578,596 B2 | 8/2009 | Martin |
| 7,623,042 B2 | 11/2009 | Huizenga |
| 7,627,372 B2 | 12/2009 | Vaisnys et al. |
| 7,633,463 B2 | 12/2009 | Negru |
| 7,638,743 B2 | 12/2009 | Bartol et al. |
| 7,665,862 B2 | 2/2010 | Villard |
| 7,677,753 B1 | 3/2010 | Wills |
| 7,688,002 B2 | 3/2010 | Ashdown et al. |
| 7,688,222 B2 | 3/2010 | Peddie et al. |
| 7,697,925 B1 | 4/2010 | Wilson et al. |
| 7,702,135 B2 | 4/2010 | Hill et al. |
| 7,703,951 B2 | 4/2010 | Piepgras et al. |
| 7,746,003 B2 | 6/2010 | Verfuerth et al. |
| D621,410 S | 8/2010 | Verfuerth et al. |
| D621,411 S | 8/2010 | Verfuerth et al. |
| 7,798,669 B2 | 9/2010 | Trojanowski et al. |
| 7,804,200 B2 | 9/2010 | Flaherty |
| 7,828,463 B1 | 11/2010 | Willis |
| 7,834,922 B2 | 11/2010 | Kurane |
| 7,872,423 B2 | 1/2011 | Biery et al. |
| 7,940,191 B2 | 5/2011 | Hierzer |
| 7,960,919 B2 | 6/2011 | Furukawa |
| 7,983,817 B2 | 7/2011 | Breed |
| 8,174,212 B2 | 5/2012 | Tziony et al. |
| 8,183,797 B2 | 5/2012 | McKinney |
| 8,207,830 B2 | 6/2012 | Rutjes et al. |
| 8,260,575 B2 | 9/2012 | Walters et al. |
| 8,290,710 B2 | 10/2012 | Cleland et al. |
| 8,324,840 B2 | 12/2012 | Shteynberg et al. |
| 8,344,665 B2 | 1/2013 | Verfuerth et al. |
| 8,376,583 B2 | 2/2013 | Wang et al. |
| 8,395,329 B2 | 3/2013 | Jutras et al. |
| 8,427,076 B2 | 4/2013 | Bourquin et al. |
| 8,436,556 B2 | 5/2013 | Eisele et al. |
| 8,445,826 B2 | 5/2013 | Verfuerth |
| 8,457,793 B2 | 6/2013 | Golding et al. |
| 8,476,565 B2 | 7/2013 | Verfuerth |
| 8,547,022 B2 | 10/2013 | Summerford et al. |
| 8,586,902 B2 | 11/2013 | Verfuerth |
| 8,604,701 B2 | 12/2013 | Verfuerth et al. |
| 8,610,358 B2 | 12/2013 | Reed |
| 8,674,608 B2 * | 3/2014 | Holland ............ H05B 33/0854 315/149 |
| 8,749,403 B2 | 6/2014 | King et al. |
| 8,749,635 B2 | 6/2014 | Högasten et al. |
| 8,764,237 B2 | 7/2014 | Wang et al. |
| 8,779,340 B2 | 7/2014 | Verfuerth et al. |
| 8,779,686 B2 | 7/2014 | Jin |
| 8,866,392 B2 | 10/2014 | Chen |
| 8,866,582 B2 | 10/2014 | Verfuerth et al. |
| 8,872,430 B2 | 10/2014 | Yang |
| 8,878,440 B2 | 11/2014 | Reed |
| 8,884,203 B2 | 11/2014 | Verfuerth et al. |
| 8,896,215 B2 | 11/2014 | Reed et al. |
| 8,901,825 B2 | 12/2014 | Reed |
| 8,921,751 B2 | 12/2014 | Verfuerth |
| 8,975,827 B2 | 3/2015 | Chobot et al. |
| 8,988,005 B2 | 3/2015 | Jungwirth et al. |
| 9,002,522 B2 | 4/2015 | Mohan et al. |
| 9,024,545 B2 | 5/2015 | Bloch et al. |
| 9,084,310 B2 | 7/2015 | Bedell et al. |
| 9,107,026 B1 | 8/2015 | Viswanadham et al. |
| 9,119,270 B2 | 8/2015 | Chen et al. |
| 9,312,451 B2 | 4/2016 | Reed et al. |
| 9,357,618 B2 | 5/2016 | Pandharipande et al. |
| 2002/0084767 A1 | 7/2002 | Arai |
| 2002/0113192 A1 | 8/2002 | Antila |
| 2003/0016143 A1 | 1/2003 | Ghazarian |
| 2003/0184672 A1 | 10/2003 | Wu et al. |
| 2004/0095772 A1 | 5/2004 | Hoover et al. |
| 2004/0105264 A1 | 6/2004 | Spero |
| 2004/0120148 A1 | 6/2004 | Morris et al. |
| 2004/0192227 A1 | 9/2004 | Beach et al. |
| 2005/0117344 A1 | 6/2005 | Bucher et al. |
| 2005/0135101 A1 | 6/2005 | Richmond |
| 2005/0174762 A1 | 8/2005 | Fogerlie |
| 2005/0174780 A1 | 8/2005 | Park |
| 2005/0179404 A1 | 8/2005 | Veskovic et al. |
| 2005/0231133 A1 | 10/2005 | Lys |
| 2005/0254013 A1 | 11/2005 | Engle et al. |
| 2006/0001384 A1 | 1/2006 | Tain et al. |
| 2006/0014118 A1 | 1/2006 | Utama |
| 2006/0053459 A1 | 3/2006 | Simerly et al. |
| 2006/0066264 A1 | 3/2006 | Ishigaki et al. |
| 2006/0098440 A1 | 5/2006 | Allen |
| 2006/0146652 A1* | 7/2006 | Huizi ................ G04G 9/0076 368/107 |
| 2006/0202914 A1 | 9/2006 | Ashdown |
| 2006/0208667 A1 | 9/2006 | Lys et al. |
| 2006/0277823 A1 | 12/2006 | Barnett et al. |
| 2007/0032990 A1 | 2/2007 | Williams et al. |
| 2007/0096118 A1 | 5/2007 | Mahalingam et al. |
| 2007/0102033 A1 | 5/2007 | Petrocy |
| 2007/0164689 A1 | 7/2007 | Suzuki |
| 2007/0224461 A1 | 9/2007 | Oh |
| 2007/0225933 A1 | 9/2007 | Shimomura |
| 2007/0247853 A1 | 10/2007 | Dorogi |
| 2007/0279921 A1 | 12/2007 | Alexander et al. |
| 2008/0018261 A1 | 1/2008 | Kastner |
| 2008/0025020 A1 | 1/2008 | Kolb |

(56) References Cited

U.S. PATENT DOCUMENTS

| | | |
|---|---|---|
| 2008/0043106 A1 | 2/2008 | Hassapis et al. |
| 2008/0062687 A1 | 3/2008 | Behar et al. |
| 2008/0130304 A1 | 6/2008 | Rash et al. |
| 2008/0215279 A1 | 9/2008 | Salsbury et al. |
| 2008/0224623 A1 | 9/2008 | Yu |
| 2008/0232116 A1 | 9/2008 | Kim |
| 2008/0248837 A1 | 10/2008 | Kunkel |
| 2008/0266839 A1 | 10/2008 | Claypool et al. |
| 2008/0271065 A1 | 10/2008 | Buonasera et al. |
| 2009/0046151 A1 | 2/2009 | Nagaoka et al. |
| 2009/0058320 A1 | 3/2009 | Chou et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195162 A1 | 8/2009 | Maurer et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0273290 A1 | 11/2009 | Ziegenfuss |
| 2009/0278474 A1 | 11/2009 | Reed et al. |
| 2009/0278479 A1 | 11/2009 | Platner et al. |
| 2009/0284155 A1 | 11/2009 | Reed et al. |
| 2009/0315485 A1 | 12/2009 | Verfuerth et al. |
| 2010/0001652 A1 | 1/2010 | Damsleth |
| 2010/0052557 A1 | 3/2010 | Van Der Veen et al. |
| 2010/0060130 A1 | 3/2010 | Li |
| 2010/0090577 A1 | 4/2010 | Reed et al. |
| 2010/0096460 A1 | 4/2010 | Carlson et al. |
| 2010/0123403 A1 | 5/2010 | Reed |
| 2010/0164406 A1 | 7/2010 | Kost et al. |
| 2010/0171442 A1 | 7/2010 | Draper et al. |
| 2010/0237711 A1 | 9/2010 | Parsons |
| 2010/0244708 A1 | 9/2010 | Cheung et al. |
| 2010/0259193 A1 | 10/2010 | Umezawa et al. |
| 2010/0270945 A1 | 10/2010 | Chang et al. |
| 2010/0271802 A1 | 10/2010 | Recker et al. |
| 2010/0277082 A1 | 11/2010 | Reed et al. |
| 2010/0295454 A1 | 11/2010 | Reed |
| 2010/0295455 A1* | 11/2010 | Reed ............... H05B 37/0218 315/152 |
| 2010/0295946 A1 | 11/2010 | Reed et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0175518 A1 | 7/2011 | Reed et al. |
| 2011/0204845 A1 | 8/2011 | Paparo et al. |
| 2011/0215724 A1 | 9/2011 | Chakravarty et al. |
| 2011/0215731 A1 | 9/2011 | Jeong et al. |
| 2011/0215751 A1 | 9/2011 | Sato |
| 2011/0221346 A1 | 9/2011 | Lee et al. |
| 2011/0248812 A1 | 10/2011 | Hu et al. |
| 2011/0251751 A1 | 10/2011 | Knight |
| 2011/0282468 A1 | 11/2011 | Ashdown |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0098439 A1 | 4/2012 | Recker et al. |
| 2012/0119669 A1 | 5/2012 | Melanson et al. |
| 2012/0119682 A1 | 5/2012 | Warton |
| 2012/0143383 A1 | 6/2012 | Cooperrider et al. |
| 2012/0153854 A1 | 6/2012 | Setomoto et al. |
| 2012/0169053 A1 | 7/2012 | Tchoryk, Jr. et al. |
| 2012/0169239 A1 | 7/2012 | Chen et al. |
| 2012/0181935 A1 | 7/2012 | Velazquez |
| 2012/0194054 A1 | 8/2012 | Johnston et al. |
| 2012/0209755 A1 | 8/2012 | Verfuerth et al. |
| 2012/0221154 A1 | 8/2012 | Runge |
| 2012/0224363 A1 | 9/2012 | Van De Ven |
| 2012/0230584 A1 | 9/2012 | Kubo et al. |
| 2012/0242254 A1 | 9/2012 | Kim et al. |
| 2012/0262069 A1* | 10/2012 | Reed ............... H05B 37/0218 315/130 |
| 2012/0286770 A1 | 11/2012 | Schröder et al. |
| 2013/0033183 A1 | 2/2013 | Verfuerth et al. |
| 2013/0049613 A1 | 2/2013 | Reed |
| 2013/0057158 A1 | 3/2013 | Josefowicz et al. |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0141010 A1 | 6/2013 | Reed et al. |
| 2013/0154488 A1 | 6/2013 | Sadwick et al. |
| 2013/0163243 A1 | 6/2013 | Reed |
| 2013/0193857 A1 | 8/2013 | Tlachac et al. |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0249479 A1 | 9/2013 | Partovi |
| 2013/0293112 A1 | 11/2013 | Reed et al. |
| 2013/0307418 A1 | 11/2013 | Reed |
| 2013/0313982 A1 | 11/2013 | Reed |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0028200 A1 | 1/2014 | Van Wagoner et al. |
| 2014/0055990 A1 | 2/2014 | Reed |
| 2014/0070964 A1 | 3/2014 | Rupprath et al. |
| 2014/0078308 A1 | 3/2014 | Verfuerth |
| 2014/0097759 A1 | 4/2014 | Verfuerth et al. |
| 2014/0139116 A1 | 5/2014 | Reed |
| 2014/0159585 A1 | 6/2014 | Reed |
| 2014/0166447 A1 | 6/2014 | Thea et al. |
| 2014/0203714 A1 | 7/2014 | Zhang et al. |
| 2014/0225521 A1 | 8/2014 | Reed |
| 2014/0244044 A1 | 8/2014 | Davis et al. |
| 2014/0265894 A1 | 9/2014 | Weaver |
| 2014/0265897 A1 | 9/2014 | Taipale et al. |
| 2014/0313719 A1 | 10/2014 | Wang et al. |
| 2014/0320027 A1 | 10/2014 | Reed |
| 2014/0359078 A1 | 12/2014 | Liu |
| 2015/0015716 A1 | 1/2015 | Reed et al. |
| 2015/0069920 A1 | 3/2015 | Denteneer et al. |
| 2015/0077019 A1 | 3/2015 | Reed et al. |
| 2015/0084520 A1* | 3/2015 | Reed ............... H05B 37/0218 315/152 |
| 2015/0123563 A1 | 5/2015 | Dahlen |
| 2015/0208479 A1 | 7/2015 | Radermacher et al. |
| 2015/0280782 A1 | 10/2015 | Arbinger et al. |
| 2015/0312983 A1 | 10/2015 | Hu et al. |
| 2016/0150622 A1 | 5/2016 | Flinsenberg et al. |
| 2017/0055324 A1 | 2/2017 | Reed |

FOREIGN PATENT DOCUMENTS

| | | |
|---|---|---|
| EP | 1 459 600 A2 | 9/2004 |
| EP | 1 734 795 | 12/2006 |
| EP | 2 320 713 A2 | 5/2011 |
| EP | 2 559 937 A1 | 2/2013 |
| EP | 2 629 491 A1 | 8/2013 |
| EP | 2 781 138 A1 | 9/2014 |
| FR | 2 883 306 | 9/2006 |
| JP | 6-335241 A | 12/1994 |
| JP | 2001-333420 | 11/2001 |
| JP | 2004-279668 A | 10/2004 |
| JP | 2004-320024 A | 11/2004 |
| JP | 2004/349065 | 12/2004 |
| JP | 2005-93171 A | 4/2005 |
| JP | 2005-198238 A | 7/2005 |
| JP | 2005-310997 A | 11/2005 |
| JP | 2006-179672 A | 7/2006 |
| JP | 2006/244711 | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-529177 A | 7/2008 |
| JP | 2008-535279 | 8/2008 |
| JP | 2010-504628 A | 2/2010 |

(56) References Cited

FOREIGN PATENT DOCUMENTS

| | | |
|---|---|---|
| KR | 10-2005-0078403 A | 8/2005 |
| KR | 10-2006-0071869 A | 6/2006 |
| KR | 10-2006-0086254 A | 7/2006 |
| KR | 10-2008-0100140 A | 11/2008 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 | 9/2002 |
| WO | 03/056882 | 7/2003 |
| WO | 2005/003625 A1 | 1/2005 |
| WO | 2006/057866 | 6/2006 |
| WO | 2007/023454 A1 | 3/2007 |
| WO | 2007/036873 | 4/2007 |
| WO | 2008/030450 | 3/2008 |
| WO | 2008/034242 A1 | 3/2008 |
| WO | 2009/040703 | 4/2009 |
| WO | 2010/086757 A1 | 8/2010 |
| WO | 2010/133719 A1 | 11/2010 |
| WO | 2011/063302 A2 | 5/2011 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

Extended European Search Report, dated May 3, 2016, for corresponding European Application No. 12771286.7, 9 pages.
Reed, "Centralized Control of Area Lighting Hours of Illumination," Office Action mailed Mar. 24, 2016 for U.S. Appl. No. 14/869,511, 31 pages.
Reed, "High Efficiency Power Controller for Luminaire," Notice of Allowance mailed Apr. 11, 2016, for U.S. Appl. No. 14/546,354, 5 pages.
Reed, "Low Power Photocontrol for Luminaire," Office Action mailed Apr. 27, 2016, for U.S. Appl. No. 14/844,944, 10 pages.
Reed, "Luminaire With Ambient Sensing and Autonomous Control Capabilities," Notice of Allowance mailed May 4, 2016, for U.S. Appl. No. 14/950,823, 10 pages.
Reed, "Solid State Hospitality Lamp," Office Action mailed Apr. 15, 2016, for U.S. Appl. No. 13/973,696, 11 pages.
Notice of Allowance mailed Mar. 16, 2017, for U.S. Appl. No. 14/552,274, Reed et al., "Apparatus and Method for Schedule Based Operation of a Luminaire," 9 pages.
Office Action mailed Feb. 17, 2017, for U.S. Appl. No. 14/939,856, Reed et al., "Luminaire With Adjustable Illumination Pattern," 13 pages.
Office Action mailed Mar. 23, 2017, for U.S. Appl. No. 15/206,019, Reed, "High Efficiency Power Controller for Luminaire," 22 pages.
Vendetti et al., "Systems and Methods for Outdoor Luminaire Wireless Control," U.S. Appl. No. 62/480,833, filed Apr. 3, 2017, 40 pages.
"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.
EE Herald, "Devices to protect High brightness LED from ESD," dated Mar. 16, 2009, retrieved Jun. 10, 2011, retrieved from http://www.eeherald.com/section/new-products/np100779.html, 1 page.
Extended European Search Report, dated Aug. 13, 2014, for corresponding European Application No. 09826926.9, 8 pages.
Extended European Search Report, dated Oct. 15, 2015, for corresponding European Application No. 12825132.9-1802, 5 pages.

Extended European Search Report, dated Sep. 28, 2015, for corresponding European Application No. 12850159.0-1802,6 pages.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report mailed Nov. 11, 2014, for International Application No. PCT/US2014/047867, 3 pages.
International Search Report, mailed Dec. 13, 2010 for PCT/US2010/035649, 3 pages.
International Search Report, mailed Dec. 15, 2010 for PCT/US2010/035658, 3 pages.
International Search Report, mailed Dec. 28, 2010 for PCT/US2010/035651, 3 pages.
International Search Report, mailed Dec. 30, 2013 for PCT/US2013/058266, 3 pages.
International Search Report, mailed Feb. 26, 2014, for PCT/US2013/070794, 3 pages.
International Search Report, mailed Feb. 27, 2013, for PCT/US2012/065476, 3 pages.
International Search Report, mailed Jan. 14, 2013, for PCT/US2012/052009, 3 pages.
International Search Report, mailed Jul. 9, 2009 for PCT/US2009/043171, 3 pages.
International Search Report and Written Opinion, mailed May 7, 2015, for corresponding International Application No. PCT/US2015/013512, 3 pages.
International Search Report, mailed Nov. 19, 2013 for PCT/US2013/052092, 4 pages.
International Search Report, mailed Oct. 8, 2012 for PCT/US2012/033059, 3 pages.
International Search Report, mailed Sep. 30, 2011, for PCT/US2011/021359, 3 pages.
Japanese Office Action, dated Jan. 6, 2015, for corresponding Japanese Application No. 2011-536564, 6 pages.
Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Panasonic Electronic Components, "LED Lighting Solutions," 2009, 6 pages.
Poplawski, "Exploring Flicker & LEDs," 2010 DOE SSL Market Introduction Workshop, U.S. Department of Energy, Jul. 22, 2010, 16 pages.
Reed et al., "Apparatus and Method for Schedule Based Operation of a Luminaire" U.S. Appl. No. 13/604,327, filed Sep. 5, 2012, 44 pages.
Reed et al., "Apparatus and Method for Schedule Based Operation of a Luminaire" Amendment filed Jun. 1, 2015, for U.S. Appl. No. 14/552,274, 14 pages.
Reed et al., "Apparatus and Method for Schedule Based Operation of a Luminaire" Notice of Allowance mailed Jun. 19, 2015, for U.S. Appl. No. 14/552,274, 8 pages.
Reed et al., "Apparatus and Method of Operating a Luminaire," Notice of Allowance mailed Apr. 27, 2015, for U.S. Appl. No. 13/558,191, 8 pages.
Reed et al., "Apparatus and Method of Operating a Luminaire," U.S. Appl. No. 13/558,191, filed Jul. 25, 2012, 84 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Gas-Discharge Lamp Replacement," U.S. Appl. No. 61/052,924, filed May 13, 2008, 32 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.

(56) References Cited

OTHER PUBLICATIONS

Reed et al., "Low-Profile Pathway Illumination System," Notice of Allowance, dated Oct. 14, 2011, for U.S. Appl. No. 12/437,472, 9 pages.
Reed et al., "Low-Profile Pathway Illumination System," Office Action, dated May 5, 2011, for U.S. Appl. No. 12/437,472, 24 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Corrected Notice of Allowance, mailed Aug. 12, 2015, and Notice of Allowance, mailed Jul. 31, 2015 for U.S. Appl. No. 13/875,130, 11 pages.
Reed et al., "Remotely Adjustable Solid-State Lamp," Office Action mailed Apr. 21, 2015, for U.S. Appl. No. 13/875,130, 10 pages.
Reed et al., "Remotely Adjustable Solid-State Lamp," Preliminary Amendment and Response to Restriction Requirement, filed Apr. 1, 2015, for U.S. Appl. No. 13/875,130, 14 pages.
Reed et al., "Systems and Methods That Employ Object Recognition," U.S. Appl. No. 13/411,321, filed Mar. 2, 2012, 51 pages.
Reed et al., "Systems and Methods That Employ Object Recognition," Amendment filed May 6, 2015, for U.S. Appl. No. 13/411,321, 20 pages.
Reed et al., "Systems and Methods That Employ Object Recognition," Amendment filed Jul. 7, 2015, for U.S. Appl. No. 13/411,321, 21 pages.
Reed et al., "Adjustable Output Solid-State Lamp With Security Features," Notice of Allowance mailed Aug. 29, 2014, for U.S. Appl. No. 13/679,687, 9 pages.
Reed et al., "Adjustable Output Solid-State Lamp With Security Features," Amendment filed Jun. 24, 2014, for U.S. Appl. No. 13/679,687, 11 pages.
Reed et al., "Adjustable Output Solid-State Lamp With Security Features," Office Action mailed Feb. 27, 2014, for U.S. Appl. No. 13/679,687, 11 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire," Office Action mailed Mar. 26, 2014, for U.S. Appl. No. 13/604,327, 10 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Notice of Allowance mailed Jul. 7, 2014, for U.S. Appl. No. 13/604,327, 8 pages.
Reed et al., "Apparatus and Method for Schedule Based Operations of a Luminaire," Office Action mailed Mar. 2, 2015, for U.S. Appl. No. 14/552,274, 7 pages.
Reed et al., "Apparatus and Method of Operating a Luminaire," Amendment filed Mar. 19, 2015, for U.S. Appl. No. 13/558,191, 20 pages.
Reed et al., "Apparatus and Method of Operating a Luminaire," Office Action mailed Dec. 22, 2014, for U.S. Appl. No. 13/558,191, 17 pages.
Reed et al., "Apparatus, Method to Change Light Source Color Temperature with Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Electrically Isolated Heat Sink for Solid-State Light," U.S. Appl. No. 61/229,435, filed Jul. 29, 2009, 29 pages.
Reed et al., "Electrostatic Discharge Protection for Luminaire," Office Action mailed Mar. 15, 2013 for U.S. Appl. No. 13/212,074, 11 pages.
Reed et al., "Gas-Discharge Lamp Replacement with Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Long-Range Motion Detection for Illumination Control," U.S. Appl. No. 12/784,080, filed May 20, 2010, 32 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Notice of Allowance mailed Jun. 20, 2014, for U.S. Appl. No. 12/784,080, 7 pages.
Reed et al., "Long-Range Motion Detection for Illumination Control," Office Action mailed Jan. 30, 2014, for U.S. Appl. No. 12/784,080, 26 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Low-Profile Pathway Illumination System," Notice of Allowance mailed Oct. 14, 2011, for U.S. Appl. No. 12/437,472, 9 pages.
Reed et al., "Low-Profile Pathway Illumination System," Office Action mailed May 5, 2011, for U.S. Appl. No. 12/437,472, 24 pages.
Reed et al., "Remotely Adjustable Solid-State Lamp," U.S. Appl. No. 13/875,130, filed May 1, 2013, 65 pages.
Reed et al., "Remotely Adjustable Solid-State Lamp," U.S. Appl. No. 61/641,781, filed May 2, 2012, 65 pages.
Reed et al., "Systems and Methods That Employ Object Recognition," Office Action mailed Feb. 9, 2015, for U.S. Appl. No. 13/411,321, 40 pages.
Reed et al., "Systems and Methods That Employ Object Recognition," Office Action mailed Aug. 25, 2014, for U.S. Appl. No. 13/411,321, 35 pages.
Reed et al., "Systems and Methods That Employ Object Recognition," Amendment filed Nov. 21, 2014, for U.S. Appl. No. 13/411,321, 20 pages.
Reed et al., "Turbulent Flow Cooling for Electronic Ballast," U.S. Appl. No. 61/088,651, filed Aug. 13, 2008, 23 pages.
Reed, "Apparatus and Method of Energy Efficient Illumination Using Received Signals," U.S. Appl. No. 13/085,301, filed Apr. 12, 2011, 99 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," Notice of Allowance mailed Apr. 23, 2015, for U.S. Appl. No. 12/619,535, 8 pages.
Reed, "Electronic Control to Regulate Power for Solid-State Lighting and Methods Thereof," Amendment filed Dec. 15, 2014, for U.S. Appl. No. 12/619,535, 21 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Amendment filed May 27, 2014, for U.S. Appl. No. 12/619,535, 22 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electronic Control to Regulate Power for Solid-State Lighting and Methods Thereof," Office Action mailed Aug. 14, 2014, for U.S. Appl. No. 12/619,535, 16 pages.
Reed, "Electronic Control to Regulate Power for Solid-State Lighting and Methods Thereof," Office Action mailed Feb. 28, 2013, for U.S. Appl. No. 12/619,535, 17 pages.

(56) References Cited

OTHER PUBLICATIONS

Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Office Action mailed Mar. 26, 2014, for U.S. Appl. No. 12/619,535, 16 pages.
Reed, "Electronic Control to Regulate Power for Solid-State Lighting and Methods Thereof," U.S. Appl. No. 14/806,500, filed Jul. 22, 2015, 52 pages.
Reed, "Electronic Control to Regulate Power for Solid-State Lighting and Methods Thereof," U.S. Appl. No. 14/806,500, filed Jul. 22, 2015.
Reed, "Electrostatic Discharge Protection for Luminaire," U.S. Appl. No. 13/212,074, filed Aug. 17, 2011, 30 pages.
Reed, "Resonant Network for Reduction of Flicker Perception in Solid State Lighting Systems," U.S. Appl. No. 61/527,029, filed Aug. 24, 2011, 41 pages.
Reed, "Solid State Lighting, Drive Circuit and Method of Driving Same," U.S. Appl. No. 13/875,000, filed May 1, 2013, 24 pages.
Reed, "Adjustable Output Solid-State Lighting Device," Amendment filed Apr. 2, 2015, for U.S. Appl. No. 13/707,123, 14 pages.
Reed, "Adjustable Output Solid-State Lighting Device," Office Acton mailed Jan. 2, 2015, for U.S. Appl. No. 13/707,123, 24 pages.
Reed, "Adjustable Output Solid-State Lighting Device," U.S. Appl. No. 61/567,308, filed Dec. 6, 2011, 49 pages.
Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 14/609,168, filed Jan. 29, 2015, 77 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Apparatus and Method of Energy Efficient Illumination Using Received Signals," U.S. Appl. No. 14/557,275, filed Dec. 1, 2014, 92 pages.
Reed, "Apparatus and Method of Energy Efficient Illumination Using Received Signals," Office Action mailed Apr. 23, 2014, for U.S. Appl. No. 13/085,301, 12 pages.
Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination Using Received Signals," Office Action mailed Oct. 1, 2013, for U.S. Appl. No. 13/085,301, 11 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination," U.S. Appl. No. 13/943,537, filed Jul. 16, 2013, 67 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," U.S. Appl. No. 14/329,508, filed Jul. 11, 2014, 61 pages.
Reed, "Electronic Control to Regulate Power for Solid-State Lighting and Methods Thereof," U.S. Appl. No. 61/154,619, filed Feb. 23, 2009, 62 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "High Efficiency Power Controller for Luminaire," U.S. Appl. No. 14/546,354, filed Nov. 18, 2014, 33 pages.
Reed, "High Efficiency Power Controller for Luminaire," U.S. Appl. No. 61/905,699, filed Nov. 18, 2013, 5 pages.
Reed, "Low Power Photocontrol for Luminaire," U.S. Appl. No. 62/137,666, filed Mar. 24, 2015, 36 pages.
Reed, "Luminaire With Ambient Sensing and Autonomous Control Capabilities," Amendment filed Mar. 13, 2015, for U.S. Appl. No. 13/786,332, 23 pages.
Reed, "Luminaire With Ambient Sensing and Autonomous Control Capabilities," Office Action mailed Dec. 17, 2014, for U.S. Appl. No. 13/786,332, 20 pages.
Reed, "Luminaire With Ambient Sensing and Autonomous Control Capabilities," U.S. Appl. No. 13/786,332, filed Mar. 5, 2013, 86 pages.
Reed, "Luminaire With Ambient Sensing and Autonomous Control Capabilities," U.S. Appl. No. 61/728,150, filed Nov. 19, 2012, 83 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
Reed, "Luminaire With Atmospheric Electrical Activity Detection and Visual Alert Capabilities," filed Mar. 5, 2013, for U.S. Appl. No. 13/786,114, 52 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," U.S. Appl. No. 61/723,675, filed Nov. 7, 2012, 73 pages.
Reed, "Photocontrol for Luminaire Consumes Very Low Power," filed Jul. 24, 2013, for U.S. Appl. No. 13/950,201, 41 pages.
Reed, "Photocontrol for Luminaire Consumes Very Low Power," U.S. Appl. No. 14/158,630, filed Jan. 17, 2014, 71 pages.
Reed, "Photocontrol for Luminaire Consumes Very Low Power," U.S. Appl. No. 61/849,841, filed Jul. 24, 2013, 41 pages.

(56) References Cited

OTHER PUBLICATIONS

Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Solid State Hospitality Lamp," U.S. Appl. No. 13/973,696, filed Aug. 22, 2013, 32 pages.
Reed, "Solid State Hospitality Lamp," U.S. Appl. No. 61/692,619, filed Aug. 23, 2012, 32 pages.
Reed, "Solid State Lighting, Drive Circuit and Method of Driving Same," U.S. Appl. No. 61/640,963, filed May 1, 2012, 24 pages.
Reed, "Systems, Methods, and Apparatuses for Using a High Current Switching Device As a Logic Level Sensor," U.S. Appl. No. 61/764,395, filed Feb. 13, 2013, 48 pages.
Reed, "Systems, Methods, and Apparatuses for Using a High Current Switching Device As a Logic Level Sensor," U.S. Appl. No. 14/179,737, filed Feb. 13, 2014, 48 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.
Written Opinion mailed Nov. 11, 2014, for International Application No. PCT/US2014/047867, 5 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Dec. 30, 2013 for PCT/US2013/058266, 8 pages.
Written Opinion, mailed Feb. 26, 2014, for PCT/US2013/070794, 10 pages.
Written Opinion, mailed Feb. 27, 2013, for PCT/US2012/065476, 8 pages.
Written Opinion, mailed Jan. 14, 2013, for PCT/US2012/052009, 5 pages.
Written Opinion, mailed Jul. 9, 2009 for PCT/US2009/043171, 8 pages.
Written Opinion, mailed Nov. 19, 2013 for PCT/US2013/052092, 7 pages.
Written Opinion, mailed Oct. 8, 2012 for PCT/US2012/033059, 3 pages.
Written Opinion, mailed Sep. 30, 2011, for PCT/US2011/021359, 4 pages.
Reed, "Luminaire With Ambient Sensing and Autonomous Control Capabilities," Office Action mailed May 29, 2015, for U.S. Appl. No. 13/786,332, 7 pages.
Reed, "Luminaire With Ambient Sensing and Autonomous Control," Amendment filed Jul. 23, 2015, for U.S. Appl. No. 13/786,332, 17 pages.
Reed , "Luminaire With Ambient Sensing and Autonomous Control Capabilities," Notice of Allowance mailed Aug. 6, 2015, for U.S. Appl. No. 13/786,332, 8 pages.
Reed, "Asset Management System for Outdoor Luminaires," U.S. Appl. No. 62/082,463, filed Nov. 20, 2014, 56 pages.
Reed, "Centralized Control Area Lighting Hours of Illumination," U.S. Appl. No. 62/057,419, filed Sep. 30, 2014, 39 pages.
Reed, "Detection and Correction of Faulty Photo Controls in Outdoor Luminaires," U.S. Appl. No. 62/068,517, filed Oct. 24, 2014, 47 pages.
Reed, "Detection and Correction of Faulty Photo Controls in Outdoor Luminaires," U.S. Appl. No. 62/183,505, filed Jun. 23, 2015, 71 pages.
Notice of Allowance mailed Mar. 24, 2017, for Reed, "Apparatus and Method of Energy Efficient Illumination Using Recieved Signals," U.S. Appl. No. 14/557,275, 23 pages.

Reed, "Electronic Control to Regulate Power for Solid-State Lighting and Methods Thereof," Amendment filed May 23, 2017 for U.S. Appl. No. 14/806,500, 11 pages.
Reed, "High Reliability Photocontrol Controls With 0 to 10 Volt Dimming Signal Line and Method," U.S. Appl. No. 62/507,730, filed May 17, 2017, 17 pages.
Vendetti et al., "Luminaire Dimming Module Uses 3 Contact Nema Photocontrol Socket," U.S. Appl. No. 15/496,985, filed Apr. 25, 2017, 23 pages.
Extended European Search Report dated Oct. 21, 2015, for corresponding EP Application No. 13835001.2-1802, 7 pages.
Extended European Search Report dated Jan. 4, 2016, for corresponding EP Application No. 13823055.2-1802, 7 pages.
International Search Report and Written Opinion, mailed Jan. 13, 2016. For PCT/US2015/053009, 15 pages.
International Search Report and Written Opinion, mailed Feb. 29, 2016, for PCT/US2015/053000, 20 pages.
International Search Report and Written Opinion, mailed Feb. 29, 2016, for PCT/US2015/053006, 21 pages.
Korean Office Action with English Translation, dated Nov. 18, 2015, for corresponding KR Application No. 10-2011-7014088, 14 pages.
Reed et al., "Long-Range Motion Detection for Illumination Control," Office Action mailed Sep. 17, 2015, for U.S. Appl. No. 14/500,512, 17 pages.
Reed et al., "Long-Range Motion Detection for Illumination Control," Amendment filed Dec. 10, 2015, for U.S. Appl. No. 14/500,512, 18 pages.
Reed et al., "Long-Range Motion Detection for Illumination Control," Office Action mailed Mar. 4, 2016, for U.S. Appl. No. 14/500,512, 18 pages.
Reed et al., "Systems and Methods That Employ Object Recognition," Office Action mailed Dec. 7, 2015, for U.S. Appl. No. 13/411,321, 47 pages.
Reed et al., "Systems and Methods That Employ Object Recognition," Amendment filed Mar. 7, 2016, for U.S. Appl. No. 13/411,321, 16 pages.
Reed, "Adjustable Output Solid-State Lighting Device," Office Action mailed Oct. 5, 2015, for U.S. Appl. No. 13/707,123, 24 pages.
Reed, "Adjustable Output Solid-State Lighting Device," Amendment filed Jan. 8, 2016, for U.S. Appl. No. 13/707,123, 11 pages.
Reed, "Adjustable Output Solid-State Lighting Device," Notice of Allowance mailed Feb. 25, 2016, for U.S. Appl. No. 13/707,123, 9 pages.
Reed, "Asset Management System for Outdoor Luminaires," U.S. Appl. No. 14/869,501, filed Sep. 29, 2015, 57 pages.
Reed, "Centralized Control Area Lighting Hours of Illumination," U.S. Appl. No. 14/869,511, filed Sep. 29, 2015, 39 pages.
Reed, "Detection and Correction of Faulty Photo Controls in Outdoor Luminaires," U.S. Appl. No. 14/869,492, filed Sep. 29, 2015, 71 pages.
Reed, "High Efficiency Power Controller for Luminaire," Office Action mailed Sep. 10, 2015, for U.S. Appl. No. 14/546,354, 15 pages.
Reed, "High Efficiency Power Controller for Luminaire," Amendment filed Feb. 9, 2016, for U.S. Appl. No. 14/546,354, 11 pages.
Reed, "Low Power Photocontrol for Luminaire," U.S. Appl. No. 14/994,569, filed Jan. 13, 2016, 36 pages.
Reed, "Low Power Photocontrol for Luminaire," U.S. Appl. No. 14/844,944, filed Sep. 3, 2015, 45 pages.
Reed et al., "Luminaire With Adjustable Illumination Pattern," U.S. Appl. No. 14/939,856, filed Nov. 12, 2015, 69 pages.
Reed, "Luminaire With Ambient Sensing and Autonomous Control Capabilities," U.S. Appl. No. 14/950,823, filed Nov. 24, 2015, 72 pages.
Reed, "Luminaire With Switch-Mode Converter Power Monitoring," Notice of Allowance mailed Nov. 18, 2015, for U.S. Appl. No. 14/074,166, 9 pages.
Reed, "Solid State Lighting, Drive Circuit and Method of Driving Same," Notice of Allowance Mailed Aug. 4, 2015, for U.S. Appl. No. 13/875,000, 10 pages.

(56) References Cited

OTHER PUBLICATIONS

Reed, "Systems, Methods, and Apparatuses for Using a High Current Switching Device As a Logic Level Sensor," Notice of Allowance for U.S. Appl. No. 14/179,737, mailed Nov. 6, 2015, 9 pages.
Notice of Allowance mailed Oct. 5, 2016 for U.S. Appl. No. 14/869,511, Reed, "Centralized Control of Area Lighting Hours of Illumination," 8 pages
Office Action mailed Jan. 18, 2017 for U.S. Appl. No. 14/806,500, Reed, "Electronic Control to Regulate Power for Solid-State Lighting and Methods Thereof," 18 pages.
Office Action mailed Sep. 19, 2016, for U.S. Appl. No. 14/552,274, Reed et al., "Apparatus and Method for Schedule Based Operation of a Luminaire," 9 pages.
Reed, "Electronic Control to Regulate Power for Solid-State Lighting and Methods Thereof," Response Under 37 CFR 1.116 filed Dec. 5, 2016 for U.S. Appl. No. 14/806,500, 12 pages.
Vendetti et al., "Systems and Methods for Controlling Luminaire Wireless Network Using Smart Appliance," U.S. Appl. No. 62/458,970, filed Feb. 14, 2017, 50 pages.
Korean Office Action with English Translation, dated May 16, 2016, for corresponding KR Application No. 10-2011-7014088, 22 pages.
Reed et al., "Apparatus and Method for Schedule Based Operation of a Luminaire," Amendment filed Jun. 7, 2016, for U.S. Appl. No. 14/552,274, 14 pages.
Reed, "Detection and Correction of Faulty Photo Controls in Outdoor Luminaires," Notice of Allowance mailed May 19, 2016 for U.S. Appl. No. 14/869,492, 9 pages.
Reed, "Electronic Control to Regulate Power for Solid-State Lighting and Methods Thereof," Office Action mailed May 9, 2016 for U.S. Appl. No. 14/806,500, 18 pages.
Reed, "Low Power Photocontrol for Luminaire," Amendment filed Jun. 13, 2016, for U.S. Appl. No. 14/844,944, 10 pages.
Extended European Search Report dated Aug. 25, 2016, for corresponding EP Application No. 14843796.5-1757, 6 pages.
Reed et al., "Apparatus and Method for Schedule Based Operation of a Luminaire" Amendment filed Dec. 7, 2016, for U.S. Appl. No. 14/552,274, 11 pages.
Reed et al., "Systems and Methods That Employ Object Recognition," Notice of Allowance mailed Jul. 18, 2016, for U.S. Appl. No. 13/411,321, 15 pages.
Reed, "Apparatus and Method of Energy Efficient Illumination Using Received Signals," Office Action mailed Aug. 23, 2016, for U.S. Appl. No. 14/557,275, 23 pages.
Reed, "Asset Management System for Outdoor Luminaires," Office Action mailed Aug. 31, 2016, for U.S. Appl. No. 14/869,501, 15 pages.
Reed, "Electronic Control to Regulate Power for Solid-State Lighting and Methods Thereof," Office Action mailed Sep. 6, 2016 for U.S. Appl. No. 14/806,500, 18 pages.
Reed, "Low Power Photocontrol for Luminaire," Notice of Allowance mailed Aug. 24, 2016, for U.S. Appl. No. 14/844,944, 7 pages.

* cited by examiner

APPARATUS AND METHOD OF OPERATING A LUMINAIRE

BACKGROUND

Technical Field

The present disclosure generally relates to the field of illumination devices and, more particularly, to control dusk-to-dawn illumination.

Description of the Related Art

Energy conservation has become of ever increasing importance. Efficient use of energy can result in a variety of benefits, including financial benefits such as cost savings and environmental benefits such as preservation of natural resources and reduction in "green house" (e.g., $CO_2$) gas emissions.

Residential, commercial, and street lighting which illuminate interior and exterior spaces consume a significant amount of energy. Conventional lighting devices or luminaires exist in a broad range of designs, suitable for various uses. Lighting devices employ a variety of conventional light sources, for example incandescent lamps, florescent lamps such as high-intensity discharge (HID) lamps (e.g., mercury vapor lamps, high-pressure sodium lamps, metal halide lamps).

There appear to be two primary approaches to reducing energy consumption associated with lighting systems. One approach employs higher efficiency light sources. The other approach selectively provides light only when needed.

Use of higher efficiency light sources may, for instance, include replacing incandescent lamps with florescent lamps or even with solid-state light sources (e.g., light emitting diodes (LEDs), organic LEDs (OLEDs), polymer LEDs (PLEDs)) to increase energy efficiency. In some instances, these higher efficiency light sources may present a number of problems. For example, florescent light sources take a relatively long time after being turned ON to achieve their full rated level of output light or illumination. Such light sources also typically have a high energy consumption during warm-up. Many higher efficiency light sources emit light with a low color rendering index (CRI). For reference, sunlight has a CRI of 100 and represents "ideal light" which contains a continuous spectrum of visible radiation. Low CRI light is less pleasing to the human eye. Surfaces illuminate with low CRI light may not be perceived in their "true" color. Low CRI light makes it more difficult to discern details, often requiring a higher level of output light or illumination to discern details that would otherwise be discernable in high CRI light. Further, higher efficiency light sources may require additional circuitry (e.g., ballasts) and/or thermal management techniques (e.g., passive or active cooling).

Providing illumination only when needed can be achieved manually by a user of the lighting system, or automatically through the use of one or more control mechanisms. Automatic control mechanisms generally fall into two broad categories, timers and environmental sensors. Timer based control mechanisms turn light sources ON and OFF based on time. The times are typically user configurable. Such relies on the user to account for changes in length of daylight which may occur throughout a year. Very often, timer based control mechanisms are set once and never updated. Environmental sensor based control mechanisms sense light or illumination level and/or motion or proximity. Light or illumination level based control mechanisms are commonly referred to dusk-to-dawn sensors. Dusk-to-dawn light or illumination level based control mechanisms turn the light sources ON when a level of light or illumination in an environment falls below a turn ON threshold, and turn the light sources OFF when the level of light or illumination exceeds a turn OFF threshold. Light or illumination level based control mechanisms advantageously automatically accommodate changes in length of daylight throughout the year. However, such control mechanisms typically employ fixed turn ON and turn OFF thresholds (e.g., 10 Lux and 30 Lux, respectively). Since the particular application or location of the luminaire is not known, the manufacturer sets the turn ON and turn OFF thresholds to accommodate a wide range of conditions. Thus, the thresholds may be set too low for applications or locations with a high volume of artificial light. Likewise, thresholds may be set too high for applications or locations with no or relatively little artificial light. Such may cause the light source(s) to be turned ON prematurely or turned OFF later than would otherwise be possible, resulting in less efficiency than might otherwise be possible. Such may also cause the light source(s) to be turned ON late or turned OFF prematurely, failing to provide adequate light when needed. Even changes in natural ambient light may cause the thresholds to be incorrect. For example, snow may reflect sufficient light to prevent the light source(s) from being turned ON.

Motion or proximity based control mechanisms (e.g., passive infrared sensor based mechanisms) turn light sources ON when motion or proximity is detected. Motion or proximity based control mechanisms turn light sources OFF after some period of time if no motion or proximity is detected during that period of time. Sensitivity of such motion or proximity based control mechanisms is typically user configurable, as is the duration between turn ON and turn OFF. However, motion or proximity based control mechanisms have limited range (e.g., 10 meters), limiting the number of applications in which such may be effectively employed. Motion or proximity based control mechanisms may also be ineffective where the ambient air temperature or temperature of an object is close to that of the trigger temperature (e.g., temperature of human body). Some lighting control mechanisms employ both light or illumination level based and motion or proximity based techniques. Such lighting control mechanisms turn light sources ON only if motion is detected while the level of light or illumination in the environment is below the turn ON threshold. Thus, the motion or proximity sensing is active only between dusk and dawn.

In addition, a failure of the automatic control mechanism, for example failure of a photosensor used to turn the light source ON or OFF dependent upon the measured ambient light level may result in the light source remaining in a continuously ON state in the event the automatic control mechanism fails in a "closed" position permitting current flow to the light source or in a continuously OFF state in the event the automatic control mechanism fails in an "open" position interrupting current flow to the light source. Either failure mode results in an unacceptable mode of operation of the light source.

Sometimes these approaches are incompatible with each other. For example, the relatively "warm up" long time required for high intensity discharge light sources to produce full output hinders the effective use of such light sources with motion or proximity based control mechanisms. Typically, high intensity discharge light sources cannot be dimmed. While some dimmable compact florescent light sources have recently become available, such exhibit poor power factors. Further, many control mechanisms are built into the luminaire. Such makes it difficult or even impossible to modify operation of the control mechanism beyond some simple user settings (e.g., sensitivity, duration between turn ON and turn OFF).

New approaches to improving the performance of lighting systems in the event of automated control mechanism failure are therefore needed.

BRIEF SUMMARY

As previously explained, lighting systems which use dusk-to-dawn control mechanisms typically provide illumination at one or more intensity levels from the point at which a photosensor or similar photosensitive element detects an ambient lighting condition indicative of a "dusk" event has decreased below a threshold value. The lighting system will continue to provide illumination at one or more intensity levels until the point at which the photosensor or similar photosensitive element detects an ambient lighting condition indicative of a "dawn" event has increased above a threshold value.

Photosensors or similar photosensitive elements used to control the operation of the lighting device are generally mounted in exposed locations on the lighting fixture. While such exposed positions can increase the accuracy of the photosensor or photosensitive element, such placement exposes the photosensor to the elements or other factors that adversely impact the life or performance of the photosensor. Depending on the failure mode of the photosensor or photosensitive element, the light source controlled by the photosensor or photosensitive element may remain in a continuously ON state or a continuously OFF state—neither of which provide satisfactory performance.

Sunrise and sunset are astronomical events that can be predicted with a high degree of accuracy for any given date and location on the surface of the Earth. Geographic locations proximate the Earth's poles will experience a greater variation in the diurnal cycle than geographic locations proximate the Earth's equatorial regions. This natural cyclical variation in sunrise and sunset times further complicates operating a light source having a failed photosensor or photosensitive element in an energy efficient manner.

A lighting system controller having at least one output controlling the flow of power to a light source can be used to minimize the impact of a failed photosensor or photosensitive element on the operation of the associated lighting system. The at least one photosensor or photosensitive element can be used as an input to the lighting system controller and at least one method of accurately determining dusk and dawn times for the geographic region in which the lighting system is located can be at least partially executed by the lighting system controller. In some instances, the lighting system controller can accurately predict future dusk and dawn times without intervention by collecting and analyzing data indicative of the ambient lighting conditions around the lighting system. In other instances, the lighting system controller can accurately predict future dusk and dawn times using data collected via one or more geolocation devices. In yet other instances, the lighting system controller can accurately predict future dusk and dawn times using user supplied data, for example the date and geolocation data from a portable electronic device.

Providing the output signal from the photosensitive transducer to the lighting system controller provides the controller with a signal that can be correlated with dusk and dawn times calculated by the lighting system controller. Such correlation can provide the lighting system controller with an indication that the photosensitive transducer is functioning within expected limits (i.e., providing an output signal generally corresponding to the diurnal cycle predicted by the dusk and dawn times) or that the photosensitive transducer is not functioning within expected limits (i.e. providing a signal which is either invariant or fails to generally correspond to the diurnal cycle predicted by the dusk and dawn times). The lighting system controller can therefore control the operation of the light source using the output signal provided by the photosensor or photosensitive element when the output signal correlates with the expected dusk and dawn times. The lighting system controller can further control the operation of the light source independent of the photosensor or photosensitive element using only the expected dusk and dawn times when the output signal from the photosensor or photosensitive element is either invariant or fails to generally correspond to the diurnal cycle predicted by the dusk and dawn times.

A luminaire may be summarized as including at least one solid-state light source; at least one photosensitive transducer responsive to at least one physical characteristic indicative of at least one light condition in an ambient environment; and a lamp control subsystem communicatively coupled to the photosensitive transducer to receive signals indicative of the at least one light condition in the ambient environment sensed by the photosensitive transducer, the control subsystem to: verify whether at least one aspect of the signals is within a threshold of an expected value for the respective at least one light condition; control a supply of power to the at least one solid-state light source responsive at least in part to the signals if verified; and control a supply of power to the at least one solid-state light source according to a schedule if not verified.

The at least one aspect that is verified may include a time of detection of the at least one light condition and the at least one light condition may be indicative of at least one daily event. The lamp control subsystem may verify whether the time of detection of the at least one light condition indicative of the at least one daily event is within a defined threshold of an expected time for the at least one daily event. The at least one daily event that the at least one light condition is indicative of may include at least one of a sunrise event or a sunset event. The lamp control subsystem may verify whether the time of detection of the at least one light condition indicative of the sunrise event is within a defined threshold of an expected time for the sunrise event and may verify whether the time of detection of the at least one light condition indicative of the sunset event is within a defined threshold of an expected time for the sunset event. The sunrise event may be associated with a sunrise threshold value and the sunset event may be associated with a sunset threshold value. The lamp control subsystem may verify whether the time of detection of the at least one light condition surpassing the sunrise threshold value is within a defined threshold of an expected time for the sunrise event and may verify whether the time of detection of the at least one light condition falling below the sunset threshold value is within a defined threshold of an expected time for the sunset event. The control subsystem may verify whether a duration between the time of detection of a least a first one and a second one of the at least one light condition is within a defined threshold of an expected duration between at least a first one of and a second one of the at least one daily event. The luminaire may further include a real time clock (RTC) communicably coupled to the lamp control subsystem to provide an RTC signal to the lamp control subsystem that is indicative of at least one of: a current date or a current time. The schedule may include the expected sunset time and the expected sunrise time, the expected sunset time and the expected sunrise time calculated by the lamp control subsystem using at least in part the current date provided by the real time clock. The luminaire may further include a non-transitory storage medium communicably coupled to the lamp control subsystem, the non-transitory storage medium that stores data indicative of a plurality of sunrise times and data indicative of a plurality of sunset times, wherein the schedule includes data indicative of at least one of: the expected sunrise time selected from the data indicative of the plurality of sunrise times, or the expected sunset time selected from the data indicative of the plurality of sunset times. The luminaire may further include a communications interface to communicably couple the lamp control subsystem to one or more external devices from which the lamp control subsystem can obtain data indicative of at least one of: a software update, a firmware update, one or more executable instruction sets, data indicative of the current date, data indicative of the current time, data indicative of an approximate longitude of the luminaire, or data indicative of an approximate latitude of the luminaire. The lamp control subsystem may further include at least one solid state power switch coupled to the solid state light source and operably controlled at least in part by the lamp control subsystem. The solid state power switch may adjust a luminous output of the solid state light source responsive to the receipt of a pulse wave modulated signal; and wherein the lamp control subsystem may generate the pulse wave modulated signal responsive to the signals indicative of the at least one light condition sensed by the photosensitive transducer.

A method of controlling the operation of a solid state light source may be summarized as including determining whether at least one aspect of at least one signal indicative of at least one light condition in an ambient environment as sensed by a photosensitive transducer is within a defined threshold of an expected value for the respective at least one light condition; in response to determining that the at least one aspect is within the defined threshold of the expected value for the respective at least one light condition, controlling a supply of power to at least one solid-state light source responsive at least in part to the at least one signal; and in response to determining that the at least one aspect is not within the defined threshold of the expected value for the respective at least one light condition, controlling a supply of power to the at least one solid-state light source according to a schedule.

Determining whether at least one aspect of at least one signal indicative of at least one light condition in an ambient environment as sensed by a photosensitive transducer is within a defined threshold of an expected value for the respective at least one light condition may include: determining a time of detection of the at least one light condition; and determining whether the at least one light condition is indicative of at least one daily event. Determining whether the at least one light condition is indicative of at least one daily event may include: determining whether the at least one light condition is indicative of at least one of a sunrise event or a sunset event. Determining whether at least one aspect of at least one signal indicative of at least one light condition in an ambient environment as sensed by a photosensitive transducer is within a defined threshold of an expected value for the respective at least one light condition may include: determining whether the time of detection of the at least one light condition indicative of the sunrise event is within the defined threshold of an expected time for the sunrise event; and determining whether the time of detection of the at least one light condition indicative of the sunset event is within the defined threshold of an expected time for the sunset event. Determining whether at least one aspect of at least one signal indicative of at least one light condition in an ambient environment as sensed by a photosensitive transducer is within a defined threshold of an expected value for the respective at least one light condition may include: determining whether the time of detection of the at least one light condition surpassing a sunrise threshold value that is associated with a sunrise event is within the defined threshold of an expected time for the sunrise event; and determining whether the time of detection of the at least one light condition falling below a sunset threshold value that is associated with a sunset event is within the defined threshold of an expected time for the sunset event. Controlling a supply of power to the at least one solid-state light source according to a schedule may include: determining an expected sunset time and an expected sunrise time; increasing a supply of power to the solid state light source at the expected sunset time; and decreasing a supply of power to the solid state light source at the expected sunrise time. Determining an expected sunset time and an expected sunrise time may include: retrieving from a non-transitory storage medium communicatively coupled to the lamp control subsystem an expected sunset time; and retrieving from the non-transitory storage medium an expected sunrise time. Determining an expected sunset time and an expected sunrise time may include: calculating the expected sunset time and the expected sunrise time using at least the current date. Controlling a supply of power to the at least one solid-state light source may include: changing the state of at least one solid state switch to permit a supply of power to the at least one solid state light source. Changing the state of at least one solid state switch to permit a supply of power to the at least one solid state light source may include: intermittently changing the state of the at least one solid state switch using a pulse wave modulated control signal to control the luminosity of the at least one solid state light source.

A luminaire controller may be summarized as including an input communicably coupled to a photosensitive switch, the input to receive an input signal from the photosensitive switch that is indicative of at least one light condition in an ambient environment; an output communicably coupled to at least one switch, the output to provide an output signal to control the supply of power to at least one solid state light source via the at least one switch; at least one non-transitory, machine readable, storage medium having machine executable instructions stored therein that cause the controller to: verify whether at least one aspect of the photosensitive switch input signal is within a threshold of an expected value for the respective at least one light condition; generate the output signal to the switch to control a supply of power to the at least one solid-state light source responsive at least in part to the photosensitive switch input signal if verified; and generate the output signal to the switch to control a supply of power to the at least one solid-state light source responsive at least in part to a schedule if not verified.

The at least one aspect that is verified may include a time of detection of the at least one light condition and the at least one light condition may be indicative of at least one daily event. The at least one processor may verify whether the time of detection of the at least one light condition indicative of the at least one daily event is within a defined threshold of an expected time for the at least one daily event. The at least one daily event that the at least one light condition is indicative of may include at least one of a sunrise event or a sunset event. The machine executable instructions may further include instructions that when executed by the at least one processor cause the at least one processor to: verify whether the time of detection of the at least one light condition indicative of the sunrise event is within a defined threshold of an expected time for the sunrise event; and verify whether the time of detection of the at least one light condition indicative of the sunset event is within a defined threshold of an expected time for the sunset event. The sunrise event may be associated with a sunrise threshold value and the sunset event may be associated with a sunset threshold value. The machine executable instructions may further include instructions that when executed by the at least one processor cause the at least one processor to: verify whether the time of detection of the at least one light condition surpassing the sunrise threshold value is within a defined threshold of an expected time for the sunrise event; and verify whether the time of detection of the at least one light condition falling below the sunset threshold value is within a defined threshold of an expected time for the sunset event. The machine executable instructions may further include instructions that when executed by the at least one processor cause the at least one processor to: verify whether a duration between the time of detection of a least a first one and a second one of the at least one light condition is within a defined threshold of an expected duration between at least a first one of and a second one of the at least one daily event. The luminaire controller may further include a real time clock (RTC) to provide an RTC signal that is indicative of at least one of: a current date or a current time. The machine executable instructions may further include instructions that when executed by the at least one processor cause the at least one processor to: calculate the schedule using at least in part the current date provided by the real time clock, wherein the schedule includes at least one of a calculated expected sunset time or a calculated expected sunrise time. The machine executable instructions may further include instructions that when executed by the at least one processor cause the at least one processor to: retrieve the schedule from the non-transitory, machine readable, storage medium, wherein the retrieved schedule [may include?] data indicative of at least one of an expected sunset time selected from the data indicative of the plurality of sunset times or an expected sunrise time selected from the data indicative of the plurality of sunrise times. The luminaire controller may further include a communications interface to obtain at least one of: a software update, a firmware update, one or more executable instruction sets, data indicative of the current date, data indicative of the current time, data indicative of an approximate longitude of the luminaire, or data indicative of an approximate latitude of the luminaire. The at least one switch may include at least one solid state switch and wherein the output signal may include a pulse wave modulated signal to control the luminosity of the solid state light source via the at least one solid state switch.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known or well-documented solar or astronomical relationships such as the "sunrise equation" and well-known structures associated with luminaires, photosensitive transducers, and the like have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments. Additionally, the terms "lighting" and "illumination" are used herein interchangeably. For instance, the phrases "level of illumination" or "level of light output" have the same meanings. Also, for instance, the phrases "illumination source" and "light source" have the same meanings.

The headings and Abstract of the Disclosure provided herein are for convenience only and do not interpret the scope or meaning of the embodiments.

Figure 1:
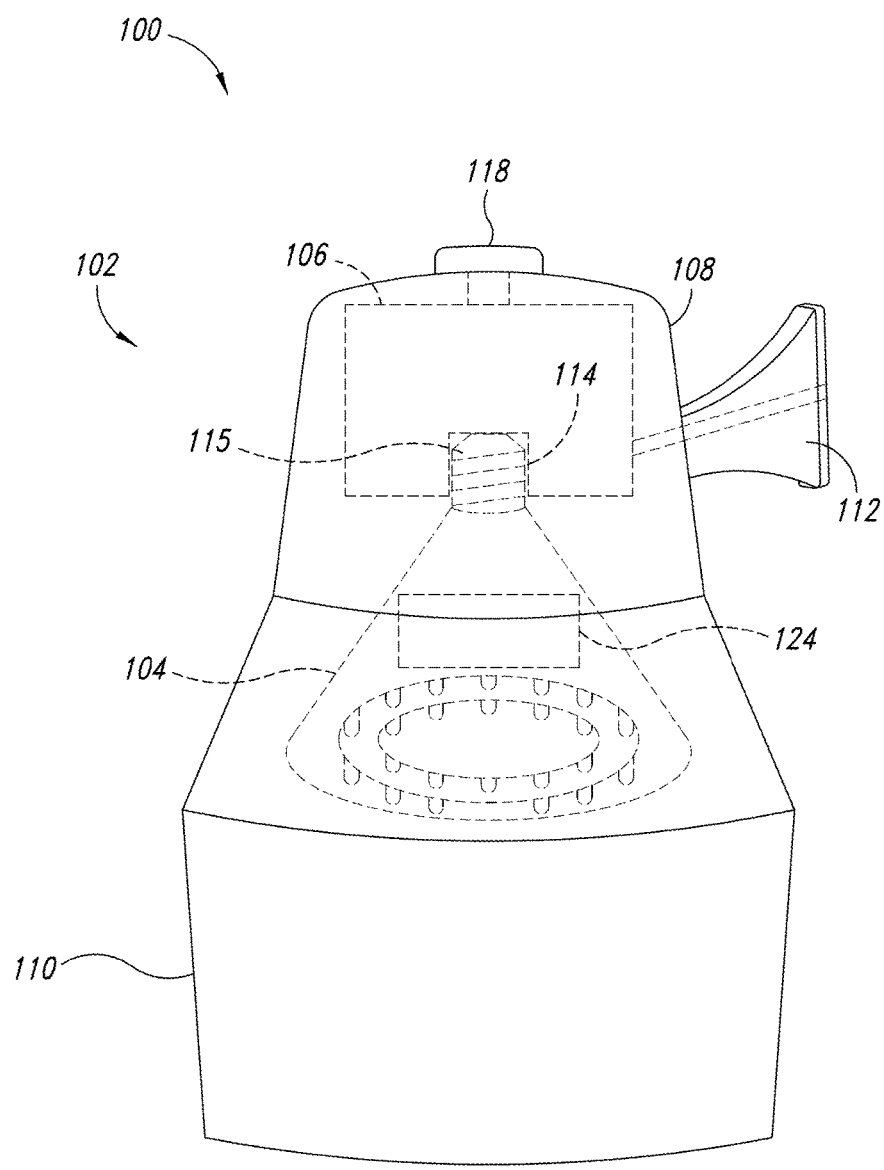
FIG. 1 is an isometric diagram showing a luminaire including a control subsystem and a light source, according to one non-limiting illustrated embodiment.

FIG. 1 shows an illumination system 100 according to one non-limiting illustrated embodiment. The illumination system 100 includes a luminaire 102, at least one illumination or light source 104, and a control subsystem 106.

The luminaire 102 may take any of a variety of forms. For example, the luminaire 102 may include a housing 108, one or more shades 110, and optionally one or more brackets 112 that allow the luminaire 102 to be suspended or otherwise supported by an external structure. The shade 110 may be transparent, translucent, or opaque. The luminaire 102 may include one or more sockets or receptacles, for instance a threaded socket or receptacle 114, sized to removably or interchangeably receive a base 115 of the light source 104. The luminaire 102 may include wiring (not called out) to supply power to the light source 104 from an external electrical power source such as an electrical power grid. Alternatively, the light source 104 may be integral to the luminaire 102, particularly where the light source 104 includes a plurality of solid-state light emitters and hence has a relatively long expected life cycle.

The control subsystem 106 may be integral to the luminaire 102. The control subsystem 106 also includes electrical circuitry or electronics that control or otherwise alter or adjust the power or illumination state of the light source(s) 104, or control one or more functions of the luminaire 102. Such functions may include, but are not limited to adjusting the illumination level of the light source(s) 104 downward at a time after the light source is turned ON and adjusting the illumination level upward at a time preceding the light source being turned OFF. Such provides lighting at relatively high levels when illumination is typically most useful, while providing lighting at reduced levels when illumination is not typically useful, thereby reducing energy usage.

As described in more detail below, the control subsystem 106 may advantageously obtain geolocation, time, or date data from one or more external devices via the one or more wired or wireless communication interfaces. Such geolocation, time, or date data may be used by the control subsystem 106 to adjust or otherwise confirm the accuracy of the one or more timers or real time clocks. Advantageously, the one or more timers or real time clocks may be useful in altering or controlling one or more operational aspects of the luminaire 102 using a calculated or looked-up schedule of solar events. Such schedule driven operation is particularly attractive, for example, after the photosensitive transducer which normally alters or controls one or more operational aspects of the luminaire 102 can no longer be verified to be operating within one or more thresholds by the control subsystem 106

The light source 104 may take a variety of forms. The light source may include one or more distinct light bulbs, lights or light emitters 122a-122n (only two called out in FIG. 1). For example, the light source 104 may take the form of one or more incandescent light bulbs. Also for example, the light source 104 may take the form of one or more florescent light bulbs such as HID light bulbs or lights or one or more arc lamps (collectively gas-discharge lamps). Advantageously, the light source 104 may take the form of one or more solid state light sources, for instance an array of LEDs, OLEDs or PLEDs. While illustrated as a bulb, the light sources do not necessarily have to be enclosed in a bulb structure. For example, the light sources may take the form of one-, two-, or even three-dimensional arrays of individual LEDs or strings of LEDs. Where appropriate, the light source 104 may also include one or more ballasts 124.

Figure 2:
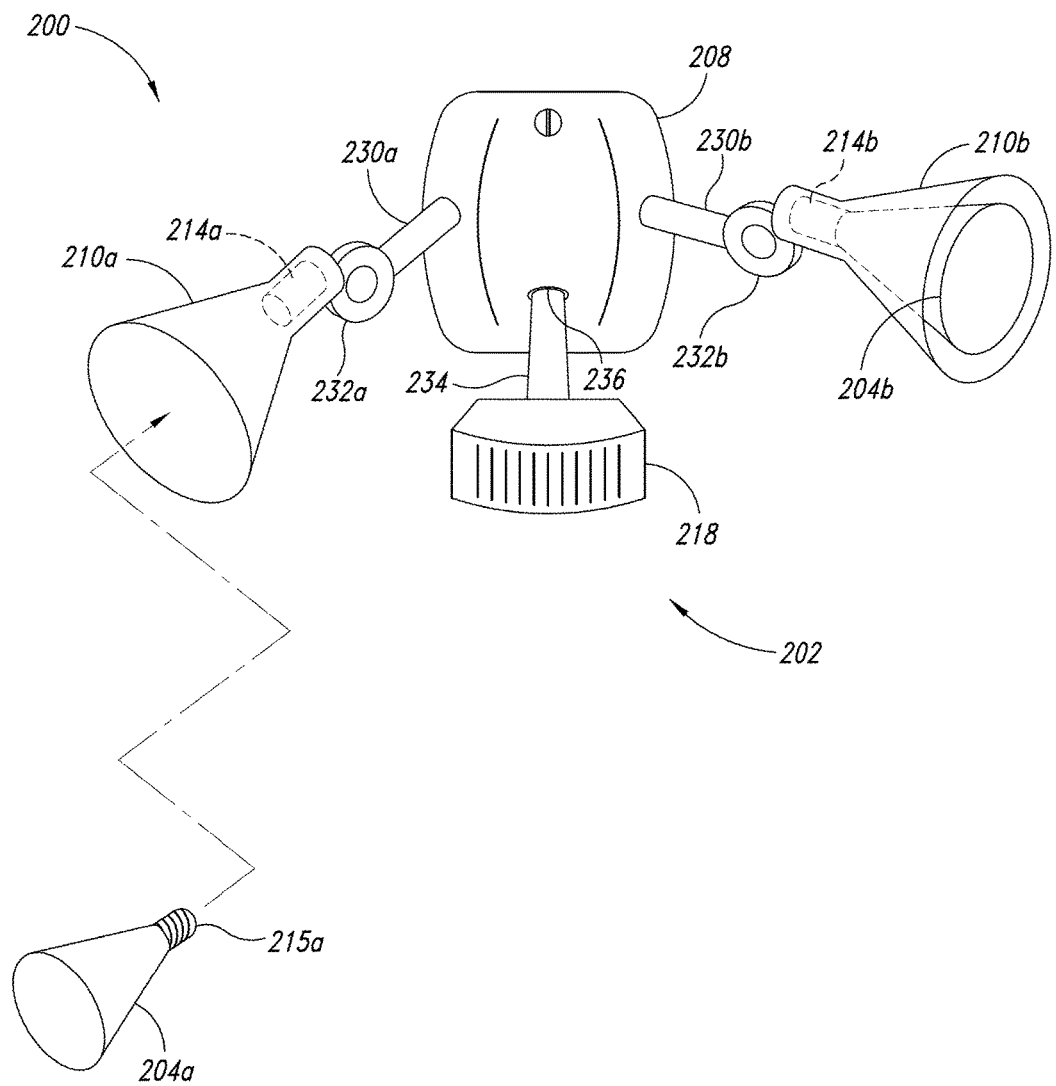
FIG. 2 is a partially exploded isometric diagram showing a luminaire and light sources, according to another non-limiting illustrated embodiment.

FIG. 2 shows an illumination system 200 according to another non-limiting illustrated embodiment. The illumination system 200 includes a luminaire 202, illumination or light sources 204a, 204b, and a control subsystem (not illustrated in FIG. 2).

The luminaire 202 may take any of a variety of forms. For example, the luminaire 202 may include a housing 208, two shades 210a, 210b, and at least one photosensitive transducer 218. The housing 208 allows the luminaire 202 to be suspended from or supported by a structure. The shades 210a, 210b each include a respective socket or receptacle 214a, 214b sized to receive a base 215a (only one visible in FIG. 2) of the light source 204a, 204b. The shades 210a, 210b may be supported from the housing 208 by respective articulated arms 230a, 230b. The arms 230a, 230b may include one or more joints 232a, 232b to provide multiple degrees of freedom which allows the shades 210a, 210b and respective light sources 204a, 204b to be positioned and oriented in any desired manner.

A photosensitive transducer 218 that alters or controls one or more aspects (e.g., ON/OFF control, luminosity, etc.) of the luminaire 202 may be supported from the housing 208 by an arm 234, for example via a ball joint 236. Such may allow the photosensitive transducer 218 to be positioned and oriented with respect to the housing 208 and any structure to which the housing is mounted. Such may also permit the positioning of the photosensitive transducer 218 in a location outside of the throw beams or spillover light from the light sources 204a, 204b.

The control subsystem includes electrical circuitry or electronics that control operation in a similar or identical manner as discussed above in reference to FIG. 1, and as discussed below with reference to FIGS. 4-13.

Figure 3:
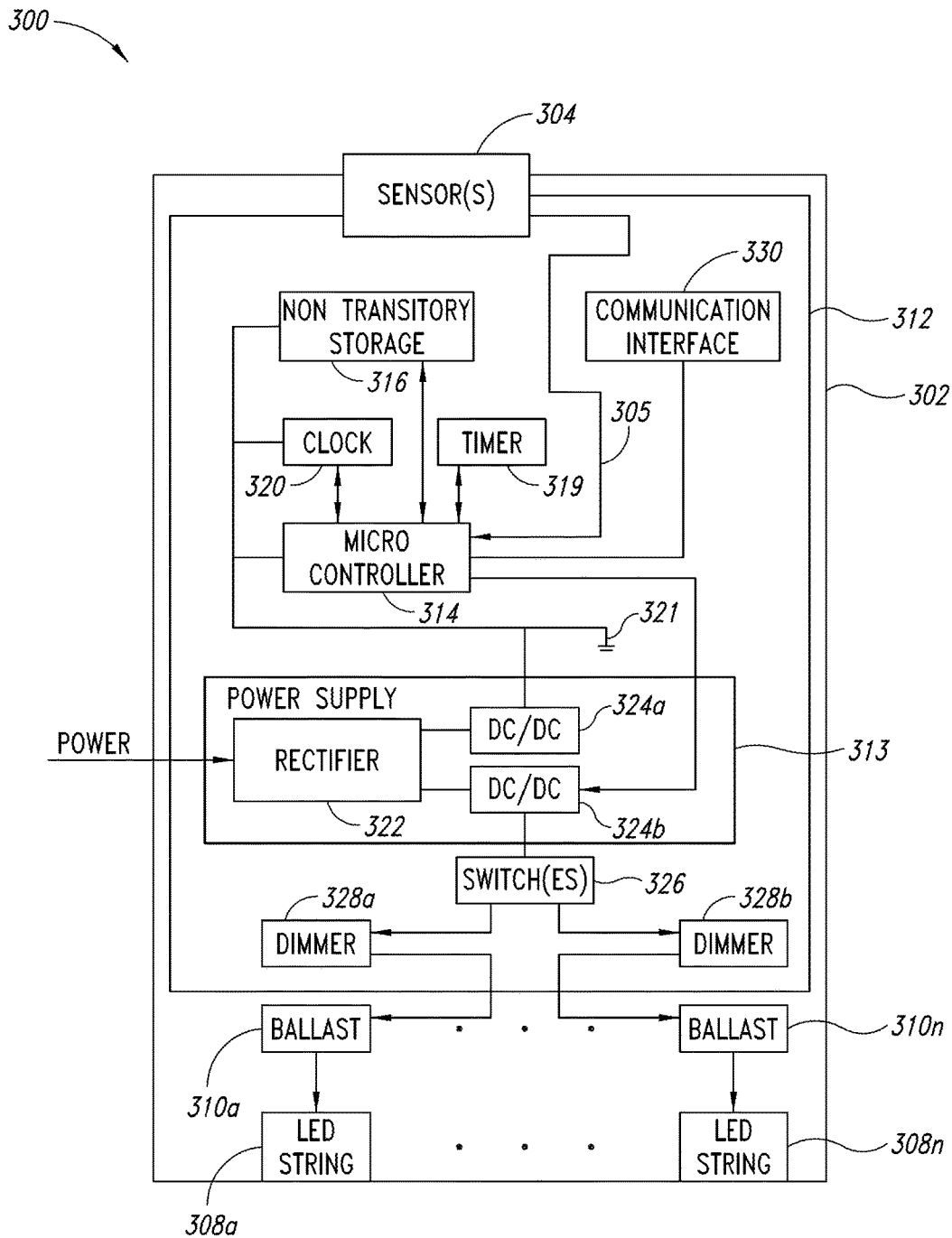
FIG. 3 is a schematic diagram showing the luminaire of FIG. 1 with the control subsystem, and a light source.

FIG. 3 illustrates an illumination system 300, according to one non-limiting illustrated embodiment. The illumination system 300 may be identical or similar to the illumination system 100 (FIG. 1), the illumination system 200 (FIG. 2), or may have a physical configuration that differs in form but is similar in function to the illumination systems 100, 200 illustrated in FIGS. 1 and 2, respectively. The illumination system 300 may employ one or more luminaires 302 (only one illustrated in FIG. 3). The luminaires 302 may, for example, be identical or similar to that illustrated in FIG. 1 or 2, or may be of any other style.

The illumination system 300 includes one or more light sources, for example strings of series electrically coupled LEDs 308a-308n (collectively 308). The light sources 308 may be selectively removable or interchangeable from the luminaire 302. Alternatively, the light sources 308 may be an integral part of the luminaire 302. Various examples of suitable light sources 308 are described above. The illumination system 300 may optionally include one or more ballasts 310a-310n (collectively 310) for the light sources 308. The ballasts 310 may form part of the control subsystem 312 or the luminaire 302. Alternatively, the ballasts 310 may be an integral or unitary part of the light sources 308.

The illumination system 300 includes a control subsystem 312 which may be integral to the luminaire 302. The control subsystem 312 may be identical or similar to the control subsystem 106 (FIG. 1). The control subsystem 312 may include a photosensitive transducer 304 that senses or is responsive to varying levels (e.g., power or intensity) of one or more light conditions in the ambient environment about the luminaire 302. The photosensitive transducer 304 may take a variety of forms, some of which are described above. The control subsystem 312 may, for example, include a microcontroller 314 and one or more non-transitory storage media 316 communicatively coupled to the microcontroller 314.

The microcontroller 314 may take any of a variety of forms, for example a microprocessor, programmable gate array (PGA), application specific integrated circuit (ASIC), digital signal processor (DSP), etc. The microcontroller 314 may require very limited computing power, for example an 8-bit microcontroller may be sufficient. The microcontroller 314 may be communicatively coupled to receive signals directly from the photosensitive transducer 304.

The one or more non-transitory storage media 316 may take any of a variety of forms, for example electrically erasable programmable read only memories (EEPROMs), flash memories, etc. In at least some instances, the one or more non-transitory storage media 316 may wholly or partially comprise removable storage media such as secure digital (SD) or compact flash (CF) cards, universal serial bus (USB) memory sticks, or similar. The one or more non-transitory storage media 316 may have sufficient capacity to store or otherwise retain one or more sets of machine executable instructions, year-long daily sunrise and sunset times at a variety of latitudes, open storage for acquired data indicative of one or more solar events including data acquired using the one or more photosensitive transducers 304. In some instances, the control subsystem 312 may automatically overwrite all or a portion of the data stored within the non-transitory storage media 316, for example every number N of daily cycles. Diurnal data collected over periods ranging from 183 to 366 days can be used to identify solar or astronomical events such as solstices and equinoxes and also to provide sufficient data to accurately forecast solar events such as sunrise times, sunset times, solar noon times, solar midnight times, dusk times, dawn times, and the like.

In at least some instances, the one or more non-transitory storage media 316 can store or otherwise retain one or more look-up tables containing astronomical or solar data. Such astronomical or solar data may include sunrise and sunset times, dusk and dawn times, solar noon and midnight times, and the like. Additionally, in at least some instances the one or more non-transitory storage media 316 can store geolocation information specific to the position of the luminaire 306 on the surface of the Earth. Such geolocation data can include at least the latitude or other similar coordinate that identifies the location of the luminaire 302 with respect to either a pole or the equator. Geolocation data can be communicated to and stored within the non-transitory storage media 316, for example, using a portable handheld electronic device having global positioning capabilities and a communications link to the luminaire 312. Alternatively, geolocation information may be loaded into a read-only portion of the one or more non-transitory storage media 316 when the luminaire 302 is manufactured, installed, or commissioned.

The control subsystem 312 may include an integrated or discrete real time clock circuit 320. For example, an integrated real time clock integrated circuit such as the PCF2129A as manufactured by NXP Semiconductors (Eindhoven, The Netherlands) may be used in some instances. Other commercially available semiconductor chips providing real time clock functionality may be equally employed. Alternatively, the microcontroller 314 may implement a real time clock based on timing signals produced by a controller or processor clock or similar oscillator. The control subsystem 312 may further include a timer circuit 319 (e.g., a digital timing circuit or an analog timer circuit). The timer circuit 319 may produce control signals at defined periods following an occurrence of defined times as indicated by the real-time clock circuit 320 of the control subsystem 312.

As explained in detail below with reference to FIGS. 4-13, the microcontroller 314 correlates the time of various astronomical or solar events such as sunrise, sunset, dusk or dawn with one or more expected, forecasted, or predicted times of occurrence to verify the operation of the photosensitive transducer 304 within one or more threshold values. In some instances, the microcontroller 314 may determine the time at which one or more ambient lighting conditions corresponding to a well defined astronomical event such as a sunrise or sunset event occur. In other instances, the microcontroller 314 may determine the time or time range at which one or more ambient lighting conditions corresponding to a less well defined astronomical event such as a dusk event or a dawn event occurs. In yet other instances, the microcontroller 314 may determine the times at which a particular rate of change in one or more ambient lighting conditions occurs. For instance, the microcontroller 314 may determine the times at which a maximum rate of change in one or more ambient lighting conditions occurs or when a minimum rate of change in one or more ambient lighting conditions occurs. The times of maximum rate of change may correspond to the midpoints between solar midnight and solar noon, and may be set as the time indicative of a dusk event and the time indicative of a dawn event. The microcontroller 314 may determine a direction of change, for example whether the light or illumination level detected by the photosensitive transducer 304 is increasing or decreasing. The microcontroller 314 may use such to match or relate the times of maximum rate of change respectively with solar midnight and solar noon. For instance, a time of maximum rate of change which occurs while the light or illumination level is increasing would indicate dawn, while a time of maximum rate of change which occurs while the light or illumination level is decreasing would indicate dusk. Various specific methods for performing such are also described below. Relying on rate of change and direction may advantageously allow the microcontroller 314 determine the diurnal cycle in a relatively short period of time as compared to other approaches.

The control subsystem 312 may include power supply circuitry 313 that rectifies, steps down a voltage and otherwise conditions supplied electrical power to a form suitable to power the microcontroller 314, non-transitory storage media 316 and/or other components of the integral control subsystem 312, as well as to power the light sources 308.

The power supply circuitry 313 may supply power to the various components of the control subsystem 312. The power supply circuitry 313 may supply power to recharge the optional standby power source 321 (e.g., battery cells, button cells, capacitors, super- or ultracapacitors, fuel cell), which supplies power to the components of the control subsystem 312 when needed, for example in the event of loss of power from the grid or other external power source. For example, the standby power source 321 may supply power to the timer circuit 319 or the real time clock circuit 320 in instances where electrical power supplied by an electrical distribution grid or network is interrupted. The standby power source 321 may also provide sufficient power to maintain the correct date and time within the real time clock 320 during the luminaire manufacturing, shipping and installation process.

In particular, power supply circuitry 313 may include one or more rectifiers 322, DC/DC converters (e.g., buck converters) 324a, 324b (collectively 324), isolation transformers, filters, smoothing capacitors, etc. to rectify, step a voltage and otherwise transform or condition electrical power from an external source into a form suitable to power the components of the control subsystem 312 and/or light sources 308. A first DC/DC buck converter 324a may step a voltage down to a first level suitable for the control electronics of the control subsystem 312. A second DC/DC converter 324b may step a voltage down or up, to a level suitable for driving the light sources 308.

The control subsystem 312 may employ a number of switches 326 or other mechanisms to turn the light source 308 ON and OFF and/or to adjust the level of light output or luminosity of the light sources 308. In some situations, the control subsystem 312 may employ various switches 326, for example contact switches, relays, solid state switches, transistors, triacs or the like to control the flow of current or power to the light sources 314. In other situations, one or more integrated devices or systems, such as a power supply 313 or power converter may be controlled or adjusted using the output signal provided by the microcontroller 314. In some instances, the light sources 308 can include one or more solid state light sources and the microcontroller 314 can provide one or more pulse wave modulated (PWM) output signals to the power supply 313, all or a portion of the number of switches 326, or both. In at least some instances, the luminosity of the solid state light sources 308 can be adjusted by controlling the duty cycle of the solid state light sources 308. For example, the overall duty cycle (and consequent luminous output) of the solid state light sources 308 may be adjusted by the control subsystem 312 by increasing or decreasing at least one of a PWM signal pulse width or a PWM signal frequency of the output signal provided to the power supply 313 or all or a portion of the number of switches 326.

In at least one embodiment, an AC/DC switched-mode power converter having digital input capabilities may be used to provide all or a portion of the power to the light sources 308. In such instances, the control signal provided by the microcontroller 314 may be used to selectively control the operation of the AC/DC switched mode converter. For example, an IRS2548D SMPS/LED Driver PFC+ Half-Bridge Control IC as manufactured by International Rectifier Corp. (Los Angeles, Calif.) may be used to control the flow of power to the light sources 308 using the output signal from the microcontroller 314. In such instances, the presence of a low output signal (e.g., a digital "0" signal) from the microcontroller 314 may permit the flow of current to the light sources 308 while the presence of a high output signal (e.g., a digital "1" signal) from the microcontroller 314 may inhibit the flow of current to the light sources 308.

Additionally, or alternatively, the control subsystem 312 may employ one or more analog or digital dimmer circuits 328a, 328b (collectively 328). Alternatively or additionally, a network link to a programmable lamp controller may be employed. Alternatively or additionally, an output from the microcontroller 314 may be used to alter or otherwise adjust the dimmer circuits 328. The control subsystem 312 may adjust the level of light by adjusting a level of light emitted by each discrete light emitter and/or by adjusting the number of discrete light emitters emitting light. For example, the control subsystem 312 may use one or more switches 326 to turn ON or turn OFF individual or groups (e.g., series strings) of light emitters that make up one or more light sources 308, or to turn ON or turn OFF dimmers 328 or lamp controllers which control the light sources 308. In some instances, the microcontroller 314 may generate one or more pulse wave modulated (PWM) output signals useful in altering or otherwise adjusting the duty cycle of the one or more solid state light sources 308 for example through the use of one or more solid state switching devices configured to receive the PWM signal as a control input.

As used herein and in the claims, adjusting an illumination level includes turning ON a light source from an OFF state in which no light or illumination is produced to an ON state at which at least some light or illumination is produced. As used herein and in the claims, adjusting an illumination level includes turning OFF a light source from an ON state in which at least some light or illumination is produced to an OFF state at which no light or illumination is produced.

As used herein and in the claims, adjusting an illumination level also includes increasing and/or decreasing a level of light or illumination produced. Such may include adjusting an output level for any given discrete light source. Such may additionally or alternatively include adjusting a total number of light sources that are in the ON state. For example, a first and second set or strings of light sources may be used to produce first level of light or illumination, while only the first set or string of light sources may be used to produce a second level of light or illumination. Also for example, a first number of light sources in a first set or string may be used to produce the first level of light or illumination, while a smaller number or subset of light sources in the first set or string may be used to produce the second level of light or illumination.

The microcontroller 314 can receive a number of output signals 305 from the photosensitive transducer 304. Each of the number of output signals 305 can be indicative of levels of light sensed in the ambient environment around or proximate the photosensitive transducer 304. Where the photosensitive transducer 304 is mounted on the luminaire 302, the number of output signals 305 from the photosensitive transducer 304 are indicative of levels of light sensed in the ambient environment around or proximate the luminaire 302. Such output signals can include one or more analog signals or one or more digital signals. The control subsystem 312 may store all or a portion of the information conveyed by the number of output signals 305 in the one or more non-transitory storage media 316. In at least some instances, additional information, such as data related to the time or date of the number of output signals 305 may be associated with a respective one or more of the number of output signals 305 and stored in whole or in part with the data collected from the respective output signal in the at least one nontransitory storage media 316.

In some instances, all or a portion of the number of output signals 305 can be analog. One or more analog-to-digital (ND) converters (not shown in FIG. 3) may be used to digitize the one or more analog output signals 305 prior to processing by the microcontroller 314. Alternatively, one or more ND converters within the microcontroller 314 may be used to digitize the one or more analog output signals 305. The microcontroller 314 can store the information to correlate or create logical relationships between the sensed levels and a time (e.g., real time) as indicated by the real time clock circuit 320. The microcontroller 314 can use the information to determine times as indicated by the real time clock circuit 320 (i.e., in the temporal reference frame of the real time clock circuit 320) with the solar cycle for any daily cycle, and to control one or more operational parameters of the solid state light sources 308 accordingly.

When mounted in an exterior location, the light or illumination levels sensed by the photosensitive transducer 304 may be representative or indicative of a solar time or solar cycle. For example, the microcontroller 314 may determine a time corresponding to a sensed ambient lighting condition that is associated with a solar dawn event to be a time at which the output signal provided by the photosensitive transducer 304 is at a level indicative of a dawn event. Such levels may not be consistent throughout year due to the position of the sun relative to the luminaire 302 or photosensitive transducer 304, the location of terrestrial obstructions to sunlight reaching the photosensitive transducer 304 (e.g., a mountain to the south of a luminaire in the northern hemisphere may block direct sunlight to the luminaire during the winter season), or regular atmospheric events (e.g., monsoon season may reduce the overall ambient light level). In at least some instances, the control subsystem 312 can be programmed to account for seasonal, atmospheric, or terrestrial effects on ambient lighting conditions as sensed by the photosensitive transducer 304.

In at least some instances, the control subsystem 312 can monitor the ambient lighting conditions for a sufficient period of time to establish the local yearly diurnal cycle with a high degree of accuracy. Such measured diurnal cycles advantageously take into consideration the effect that local environmental factors such as seasonal variability, terrestrial obstructions and the like may have on solar events such as sunrise and sunset. Having determined the local diurnal cycle either by calculation or measurement via the photosensitive transducer 304, the microcontroller 314 may simply track the passage of time using the real time clock circuit 320 rather than by performing comparisons to the number of output signals 305 to establish appropriate ON and OFF times for the at least one solid state light source 308.

One or more wired or wireless communications interfaces 330 may be disposed within the control subsystem 312. Such communications interfaces 330 may include, but are not limited to one or more optical (e.g., infrared), wired (e.g., IEEE 802.3, Ethernet, etc.) or wireless (e.g., IEEE 802.11—WiFi®; cellular—GSM, GPRS, CDMA, EV-DO, EDGE, 3G, 4G; Bluetooth®; ZigBee®; Near Field Communications; etc.) communication interfaces. The one or more communication interfaces 330 may be communicably coupled to the microcontroller 314 or the one or more non-transitory storage media 316 and can be useful in bidirectionally exchanging data between the control subsystem 312 and one or more external devices.

In some instances, a photosensitive transducer 304 may not be available to control one or more aspects of the luminaire 302. In fact, situations may occur where the photosensitive transducer 304, for some reason, is not installed at the time the luminaire 302 is installed and placed into service. In such instances, operation of the luminaire 302 at appropriate times (e.g., operation of the luminaire in a cycle approximating the local solar cycle) is still desirable. In such instances, the control subsystem 312 may be used to control the operation of the luminaire 302 based on local date, time, or latitude data stored in the nontransitory storage media 316. Such data may be stored in the nontransitory storage 316 at the time of installation or commissioning of the luminaire 302. The microcontroller 314 can use the stored date, time, or latitude data along with a time-keeping circuit such as a timer circuit 319 or real time clock circuit 320 to either calculate (e.g. using the sunrise equation) or look-up (e.g. using look-up tables stored in the nontransitory storage media 316) the expected solar event times for the location of the luminaire 302.

Figure 4:
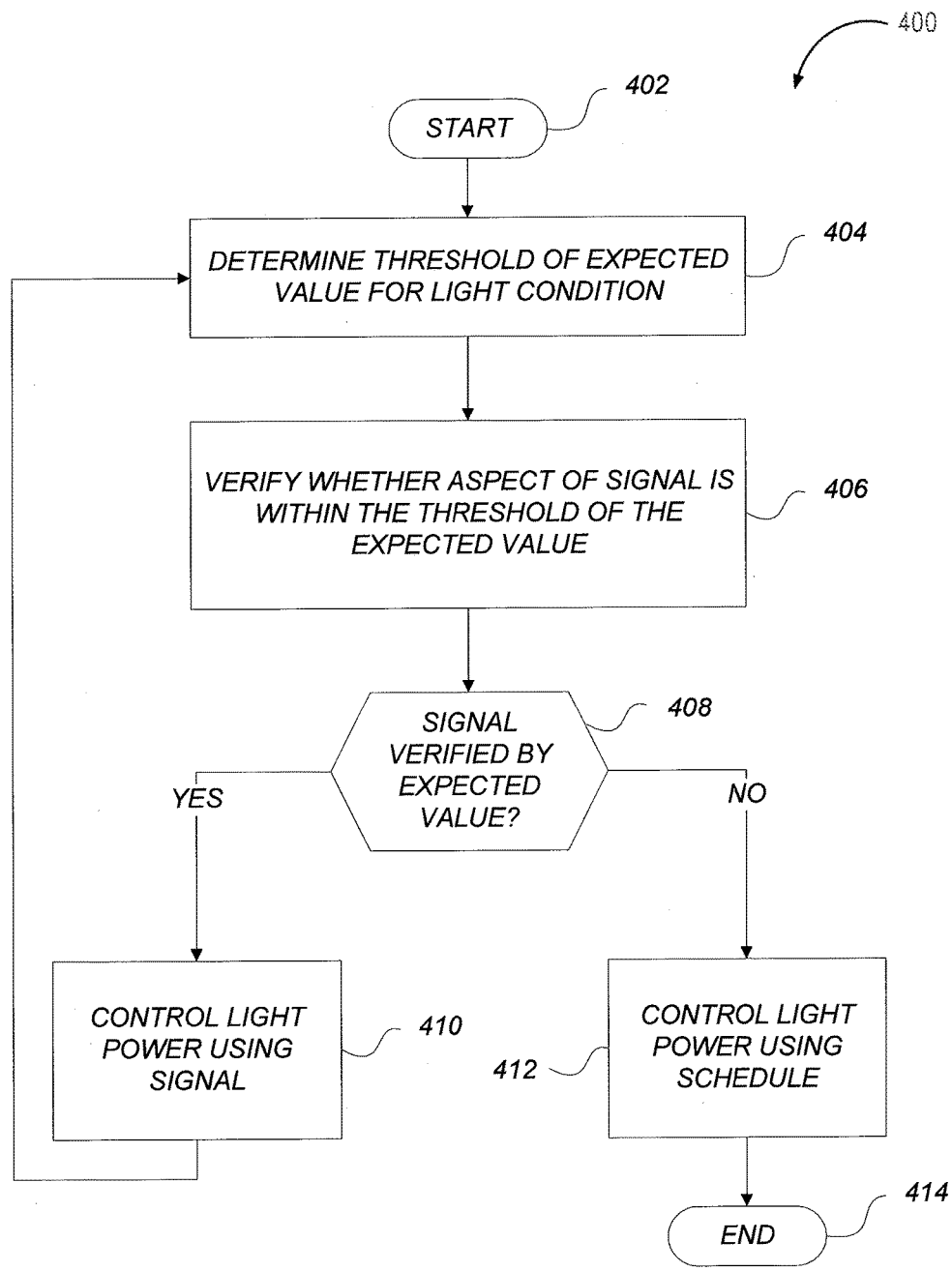
FIG. 4 is a flow diagram showing a high level method of operating an illumination system to provide illumination in the event of a photosensor failure, according to one non-limiting illustrated embodiment.

FIG. 4 shows a high level method 400 of operating an illumination system to provide illumination either in response to at least one of a number of output signals 305 provided by a verified photosensitive transducer 304 or in response to a schedule. The high level method 400 may be rendered as one or more sets of machine executable instructions at least partially stored in the at least one non-transitory storage media 316 and executed by the microcontroller 314. The method commences at 402.

The at least one photosensitive transducer 304 provides the number of output signals 305 to the microcontroller 314. One or more aspects of at least a portion of the number of output signals 305 are related to one or more ambient lighting conditions. Such aspects may include an analog output signal voltage, current, or frequency that is indicative of the intensity or quantity of ambient light falling incident upon the at least one photosensitive transducer 304. Such aspects may include a digital signal output level that is indicative of the intensity or quantity of ambient light falling incident upon the at least one photosensitive transducer 304. Such aspects may include a rate of change in one or more analog or digital signal output levels indicative of a solar event of increasing intensity (e.g., sunrise or dawn) or indicative of a solar event of decreasing intensity (e.g., sunset or dusk).

A solar event, such as a sunrise event or a sunset event will affect one or more aspects of the output signals 305 provided by the photosensitive transducer 304. Each solar event may have one or more characteristic or representative thresholds or threshold values related to various aspects of the output signal 305 that have been determined as indicative of such solar events. Data indicative of such thresholds or threshold values may be stored or otherwise retained within the non-transitory storage media 316. Threshold or threshold value data may have one or more discrete values or one or more ranges of discrete values associated with one or more solar events. For example, an output signal above a first threshold value may indicate a solar noon event, an output signal below a second threshold value may indicate a solar midnight event, an output signal having a rate of change falling within a third threshold range of values may indicate a sunrise event, and an output signal having a rate of change falling within a fourth threshold range of values may indicate a sunset event.

At 402, the control subsystem 312 determines a threshold of an expected value for at least one light condition detectable by the at least one photosensitive transducer 304. At 402, the control subsystem 312 can compare all or a portion of the number of output signals 305 with one or more threshold values or threshold range of values stored within the non-transitory storage media 316 to determine whether the output signals 305 is or has occurred. The at least one light condition can include one or more measurable events detectable as a change in one or more aspects of the output signal 305 provided by the at least one photosensitive transducer 304. Events capable of causing a detectable change in the output signal 305 may include a change in a light condition indicative of a sunrise event, a change in a light condition indicative of a solar noon event, a change in a light condition indicative of a sunset event, or a change in a light condition indicative of a solar midnight event. The at least one light condition can include one or more measurable events detectable as a rate of change in one or more aspects of the output signal 305 provided by the at least one photosensitive transducer 304. Events capable of causing a detectable rate of change in the output signal 305 may include a rate of change in a light condition indicative of a sunrise event, a rate of change in a light condition indicative of a solar noon event, a rate of change in a light condition indicative of a sunset event, or a rate of change in a light condition indicative of a solar midnight event.

At 404, the control subsystem 312 verifies whether one or more aspects of at least one of the number of output signals 305 from the photosensitive transducer 304 is within a threshold of the expected value determined in 402. In at least some instances, the one or more aspects of at least one of the number of output signals 305 can include one or more intrinsic signal parameters including, for example data carried by the output signal 305 that is indicative of one or more output signal components, levels, rates of change, or the like.

In other instances, the aspect of the number of signals 305 can include one or more extrinsic signal parameters such as the time of day as measured by the real time clock circuit 320 at which a signal having a known level is received, the time of day at which a signal having a known level is lost, the time of day at which one or more signal components exceeds a level, the time of day at which one or more signal components falls below a level, the time of day at which a rate of change of one or more signal parameters exceeds a level, the time of day at which a rate of change of one or more signal parameters falls below a level, or the like. In at least some instances, the aspect of at least one of the number of signals from the photosensitive transducer 304 can include one or more extrinsic (e.g., time of receipt) and intrinsic (e.g., voltage level, rate of change, etc) signal parameters.

At 406, the control subsystem 312 verifies that the one or more extrinsic or intrinsic aspects of at least one of the number of output signals 305 falls within a threshold of the expected value determined in 402. A value that is within the threshold of the expected value determined in 402 verifies one or more aspects of the photosensitive transducer 304 output signal. For example, if the measured aspect is 7:05 P.M. (the time of day the output signal is received), the light condition indicated by the output signal 305 is dusk, and the threshold is a range of values from 6:55 P.M. to 7:15 P.M., then the output signal 305 would be verified since dusk was detected at 7:05 P.M. and the expected value was between 6:55 P.M. and 7:15 P.M. Conversely, a value that is outside of the threshold of the expected value determined in 402 fails to verify one or more aspects of the photosensitive transducer 304 output signal. For example, if the measured aspect is 7:05 P.M. (the time of day the output signal is received), the light condition indicated by the output signal 305 is dawn, and the threshold is a range of values from 6:05 A.M. to 6:25 A.M., then the output signal 305 would not be verified since a lighting condition indicating a dawn event was detected at 7:05 P.M. and the expected value was between 6:05 A.M. and 6:25 A.M.

A verified output signal 305 provided by the photosensitive transducer 304 to the microcontroller 314 may in some instances permit the microcontroller 314 to alter, adjust, or control one or more aspects of the operation of the at least one solid state light source 308 based at least in part on the output signal 305 at 410. For example, turning at least a portion of the solid state light sources 308 ON when a lighting condition indicative of a "dusk" condition is indicated and OFF when a lighting condition indicative of a "dawn" condition is indicated.

A non-verified output signal 305 provided by the photosensitive transducer 304 to the microcontroller 314 may in some instances provide an indication to the microcontroller 314 that the photosensitive transducer 304 is not providing an expected output signal commensurate with one or more expected lighting conditions. For example, the photosensitive transducer 304 may have failed in an "open" or "closed" position, thereby providing a signal that is generally invariant with time. Determination that an output signal 305 is not verified may cause the microcontroller 314 to control the operation of the at least one solid state light source 308 based at least in part on a schedule at 412. For example, the microcontroller 314 may turn ON at least a portion of the solid state light sources 308 at a time corresponding to an expected, calculated, or looked-up "dusk" time and OFF at a time corresponding to an expected, calculated, or looked-up "dawn" time.

Figure 5:
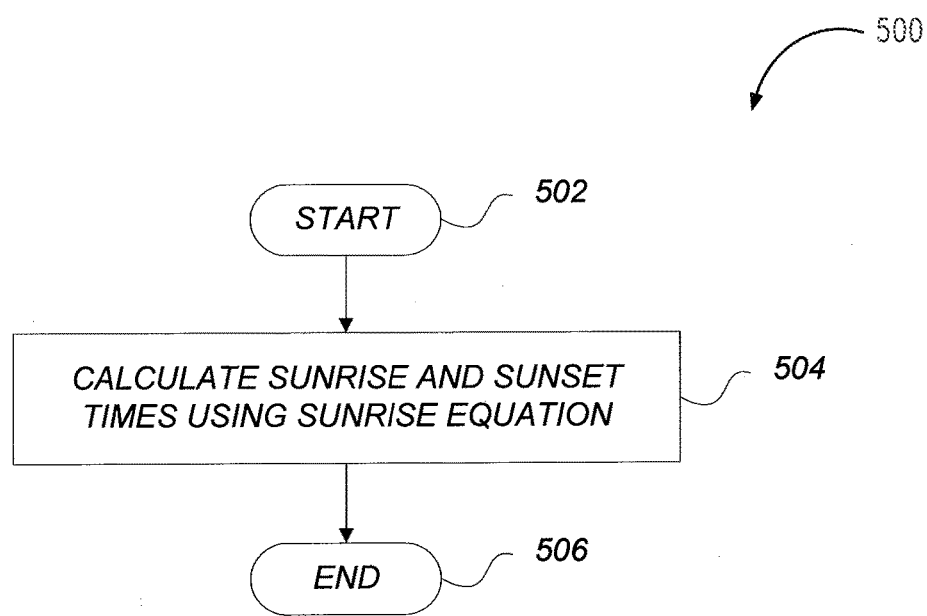
FIG. 5 is a flow diagram showing a low level method of calculating expected sunrise and sunset times, according to one non-limiting illustrated embodiment.

FIG. 5 shows a low level method 500 of calculating expected times for solar events such as sunrise, sunset, solar noon, solar midnight and the like. Calculated solar event times may provide one or more expected values against which at least one aspect of the output signal 305 from the photosensitive transducer 304 is compared at 406. Calculated solar or astronomical event times may provide all or a portion of the schedule used by the microcontroller 314 to alter, adjust, or otherwise control one or more aspects of the solid state light sources 308 at 412.

In at least some instances, the calculated time of a known solar event (e.g., sunrise or sunset) may be used by the microcontroller 314 to confirm or otherwise affirm operation of the photosensitive transducer 304. Time or output signal thresholds may be used to account for varying ambient light conditions and slight inaccuracies in clocking or photosensitive transducer 304 manufacture.

When the microcontroller 314 is unable to verify or unsuccessful in verifying one or more aspects of the output signal 305 provided by the at least one photosensitive transducer 304, the microcontroller 314 can alter, adjust, or otherwise control the operation of the solid state light source 308 using a schedule that includes data indicative of relevant solar events. In at least some instances, one or more logical conditions may be combined with the schedule to generate more complex instructions, for example conditions precedent or conditions subsequent, that are stored within the non-transitory storage media 316 and executable by the microcontroller 314. For example, one logical condition provided to the microcontroller 314 may instruct the microcontroller to "turn ON the solid state light source 10 minutes prior to sunset." Another logical condition provided to the microcontroller 314 may instruct the microcontroller to "reduce luminosity of the solid state light source 180 minutes after sunset."

In the absence of a verified output signal from the at least one photosensitive transducer 304, the microcontroller 314 determines one or more aspects of a lighting condition using one or more calculations, one or more schedules, one or more derived values, one or more looked-up values, or combinations thereof. FIG. 5 provides a flow diagram showing one illustrative method of calculating one or more schedules. The method commences at 502.

At 504 one or more astronomical or solar relationships that have been reduced to one or more equations, for example the sunrise equation, are used determine the expected sunrise or sunset time. The determination of the expected sunrise or sunset time may reflect local geographic, meteorologic, atmospheric or temporal data that is either determined by the control subsystem 312, stored within the non-transitory storage media 316, provided by an external source such as a network connection to the communications interface 330, or some combination thereof. Geographic data may include the physical latitude or longitude of the luminaire 302 which is determinable by the lamp control subsystem 312 using, for example, a global positioning receiver that is either temporarily or permanently communicably coupled to the lamp control subsystem 312 directly or via communications interface 330. Such geographic data may also be communicated on a periodic or one-time basis to the lamp control subsystem 312 and stored in a non-volatile portion of the non-transitory storage media 316, for example via the communications interface 330. Temporal data may include a Julian date or a calendar date and time. Such temporal data may be transmitted on a periodic or one-time basis to the lamp control subsystem 312 via the communications interface 330 and tracked using the timer 319 or the real time clock circuitry 320 in the lamp control subsystem 312. Atmospheric data may include cloud cover data that is transmitted near-real time to the control subsystem 312 via a network connection to the communications interface 330.

In at least some instances, all or a portion of the temporal data stored in the non-transitory storage media 316 may be intermittently confirmed or otherwise verified using one or more external devices or systems via the communications interface 330. In one instance, the date and time may be verified using an IEEE 802.11 or Bluetooth wireless connection to a portable device such as a cellular telephone or portable computing device having the correct time and date. In another instance, the date and time may be verified using a GSM, CDMA or similar wireless connection to a cellular network having the correct time and date.

In other instances, all or a portion of the geographic data stored in the non-transitory storage media 315 may be intermittently confirmed or otherwise verified against one or more external devices or systems via the communications interface 330. In one instance, geographic location data may be verified using an IEEE 802.11 or Bluetooth wireless connection to a portable device such as a cellular telephone or portable computing device having a global positioning system (GPS) receiver capable of geolocating the luminaire 302. In other instances, the geographic location may be verified by triangulation using a GSM, CDMA or similar wireless connection to a cellular network.

In some instances, the calculated sunrise, sunset, solar noon or solar midnight times can be used by the lamp control subsystem 312 to provide at least a portion of the expected value against which at least one aspect of the output signal 305 is verified at 406. For example, in at least some instances, the time that an output signal 305 indicative of an ambient light condition (e.g., sunrise, sunset, solar noon or solar midnight times) is received from the photosensitive transducer 304 may be compared to the microcontroller calculated (i.e., the expected) time of the solar event. In some instances, the calculated sunrise, sunset, solar noon or solar midnight times can be used by the lamp control subsystem 312 to at least partially alter, adjust or otherwise control at least one aspect of the operation of the at least one solid state light source 308 according to a schedule at 412. After calculating the sunrise, sunset, solar noon, or solar midnight times at 504, the method 500 concludes at 506.

Figure 6:
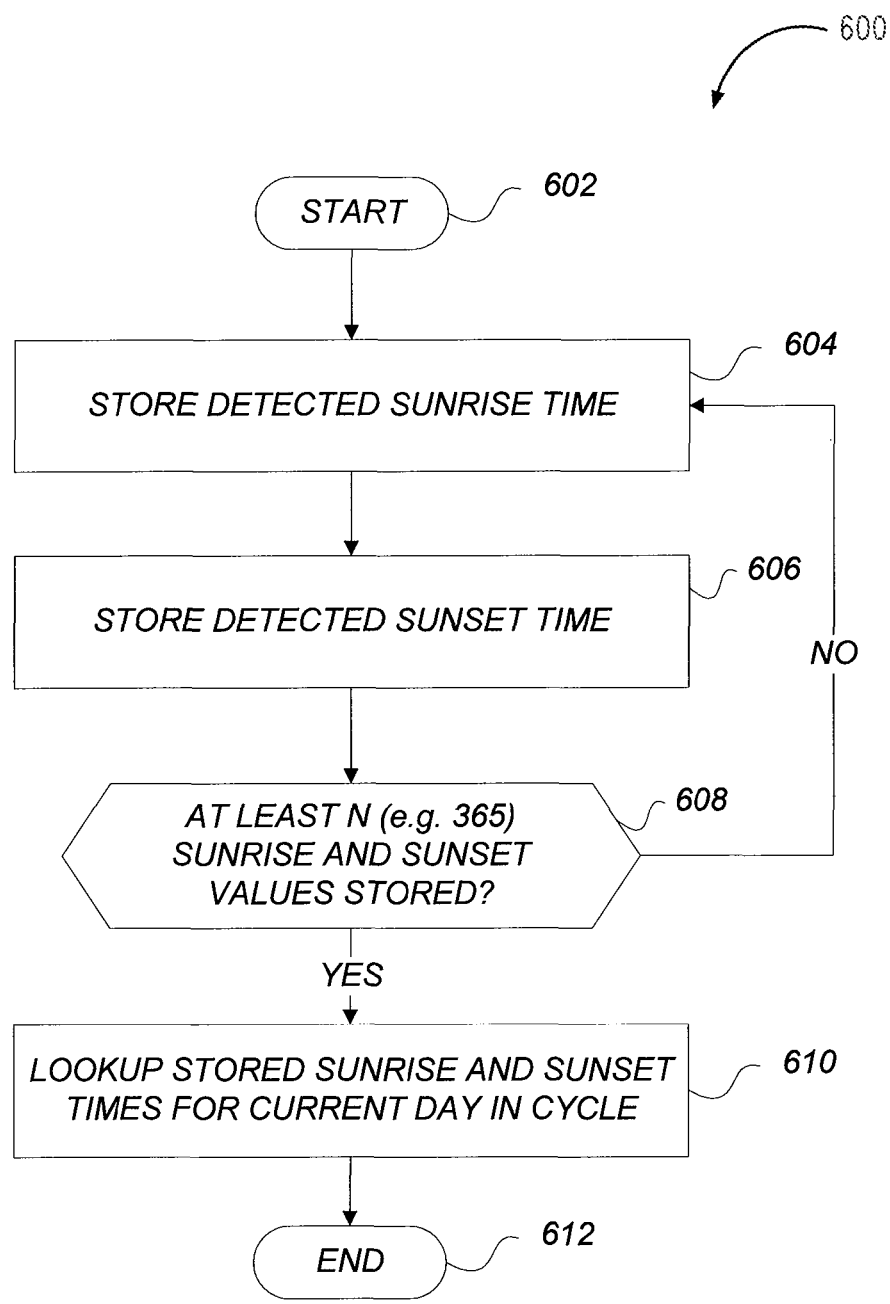
FIG. 6 is a flow diagram showing a low level method of looking up expected sunrise and sunset times using observed sunrise and sunset times, according to one non-limiting illustrated embodiment.

FIG. 6 shows a low level method 600 of acquiring, storing, and retrieving expected times for solar events such as sunrise, sunset, solar noon, solar midnight and the like. Looked-up solar event times may be used provide the expected value against which at least one aspect of the output signal from the photosensitive transducer 304 is compared at 406. Looked-up solar event times may also provide all or a portion of the schedule used by the microcontroller 314 to alter, adjust, or otherwise control one or more aspects of the solid state light sources at 308 412.

The method 600 uses the photosensitive transducer 304 and a timer circuit 319 or real-time clock circuit 320 to determine chronological data related to (e.g., time and date) of one or more solar events. Data indicative of the solar event and the related chronological information may be at least partially stored in the non-transitory storage media 316. Repeating the acquisition and storage of such data for a period of time can generate a solar event look-up table that takes into account all of the local environmental factors about the luminaire 302 since the look-up table incorporates ambient light data collected by the photosensitive transducer 304. In at least some instances, such look-up tables may provide the expected value for one or more astronomical or solar events against which at least one aspect of the output signal 305 from the photosensitive transducer 304 is compared at 406. Looked-up solar event times may provide all or a portion of the schedule used by the microcontroller 314 to control the flow of power to the light sources at 412.

When the microcontroller 314 is unable to verify or unsuccessful in verifying the output signal 305 provided by the at least one photosensitive transducer 304, the microcontroller 314 can alter, adjust, or otherwise control one or more aspects of the solid state light sources 308 using schedule that includes data indicative of relevant solar events. In at least some instances, one or more logical conditions may be combined with the schedule to generate more complex logical instructions, conditions precedent, or conditions subsequent that are stored within the non-transitory storage media 316 and executable by the microcontroller 314. For example, one logical condition provided to the microcontroller 314 may instruct the microcontroller to "turn ON the solid state light source 10 minutes prior to sunset." Another logical condition provided to the microcontroller 314 may instruct the microcontroller to "reduce luminosity of the solid state light source 180 minutes after sunset."

In the absence of a verified output signal from the at least one photosensitive transducer 304, the microcontroller 314 determines one or more aspects of a lighting condition using one or more calculations, one or more schedules, or combinations thereof.

The method commences at 602. At 604 chronological data associated with a sunrise event is collected by the microcontroller 314 and stored within the non-transitory storage media 316. In determining the occurrence of a sunrise event, the microcontroller 314 can examine one or more signal characteristics of the output signal 305 provided by the photosensitive transducer 304. In some instances, the microcontroller 314 may associate an increase in voltage of the output signal 305 with a sunrise event (e.g., an output signal 305 voltage rising above a 1.3 VDC threshold may indicate a sunrise event). In other instances, the microcontroller 314 may associate a rate of increase in voltage of the output signal 305 with a sunrise event (e.g., an output signal 305 voltage rate of increase greater than 0.01 VDC/minute may indicate a sunrise event). Such threshold levels, values, or ranges that are characteristic or otherwise indicative of one or more astronomical or solar events may be provided to the microcontroller 314 from the non-transitory storage media 316 where they are stored either upon manufacture, installation, or configuration.

In addition to the output signal 305, the microcontroller 314 also has access to chronological data. Such chronological data may include, but is not limited to date and time data collected from either an timer circuit 319 or a real time clock circuit 320. In at least some instances, the accuracy of the chronological data provided by the timer circuit 319 or the real time clock circuit 320 may be confirmed against one or more external time-keeping devices. For example, against time and date data available across GSM, CDMA, or 3G cellular networks, or against the system date and time of a portable electronic device used to communicate with the control subsystem 312 via the communications interface 330.

Chronological data that is indicative of the detected time of the sunrise event is stored in the non-transitory storage media 316. Such data may include, for example data indicative of the time and date of the sunrise event (e.g., May 13, 2012, 6:34 A.M.). Such data may optionally include the one or more measured signal parameters of the output signal (e.g., 1.24 VDC voltage level or 0.0133 VDC/minute voltage rise rate).

At 606 chronological data associated with a sunset event is collected by the microcontroller 314 and stored within the non-transitory storage media 316. In determining the occurrence of a sunset event, the microcontroller can examine one or more signal characteristics of the output signal 305 provided by the photosensitive transducer 304. In some instances, the microcontroller 314 may associate a decrease in voltage of the output signal 305 with a sunset event (e.g., an output signal voltage of less than 1.1 VDC may indicate a sunset event). In other instances, the microcontroller 314 may associate a rate of voltage decrease or drop in the output signal 305 with a sunset event (e.g., an output signal voltage decrease greater than 0.01 VDC/minute may indicate a sunset event). Such levels or values may be provided to the microcontroller 314 from the non-transitory storage media 316 where they are stored either upon manufacture, installation, or configuration.

Chronological data that is indicative of the detected time of the sunset event is stored in the non-transitory storage media 316. Such data may include, for example data indicative of the time and date of the sunset event (e.g., May 13, 2012, 7:46 P.M.). Such data may optionally include the one or more measured signal parameters of the output signal (e.g., 1.13 VDC voltage level or 0.0128 VDC/minute voltage drop rate).

At 608 the microcontroller 314 can confirm whether a number ("N") of sunrise and sunset values have been stored in the non-transitory storage media 316. In at least one embodiment, the microcontroller 314 can confirm whether 365 sets of sunrise and sunset values (i.e., a year's worth of sunrise and sunset values) have been stored. If fewer than "N" sunrise and sunset values have been stored at 608, the method returns to 604 to collect an additional set of sunrise and sunset values.

If "N" or greater sunrise and sunset values have been stored at 608, the microcontroller 314 can proceed to 610 to lookup the expected sunrise or sunset value using the date and time provided by the timer circuit 319 or the real time clock circuit 320. Such looked-up sunrise or sunset values that have been stored in the non-transitory storage media 316 using the method 600 may be used to provide the "expected value" to which the at least one aspect of the output signal 305 is compared to verify the operation of the photosensitive transducer 304 at 406. Such looked-up sunrise or sunset values that have been stored in the non-transitory storage media 316 may be used to control one or more aspects (e.g., ON/OFF, luminosity, etc.) of the operation of the at least one solid state light source 308 at 412. The method 600 concludes at 612.

Figure 7:
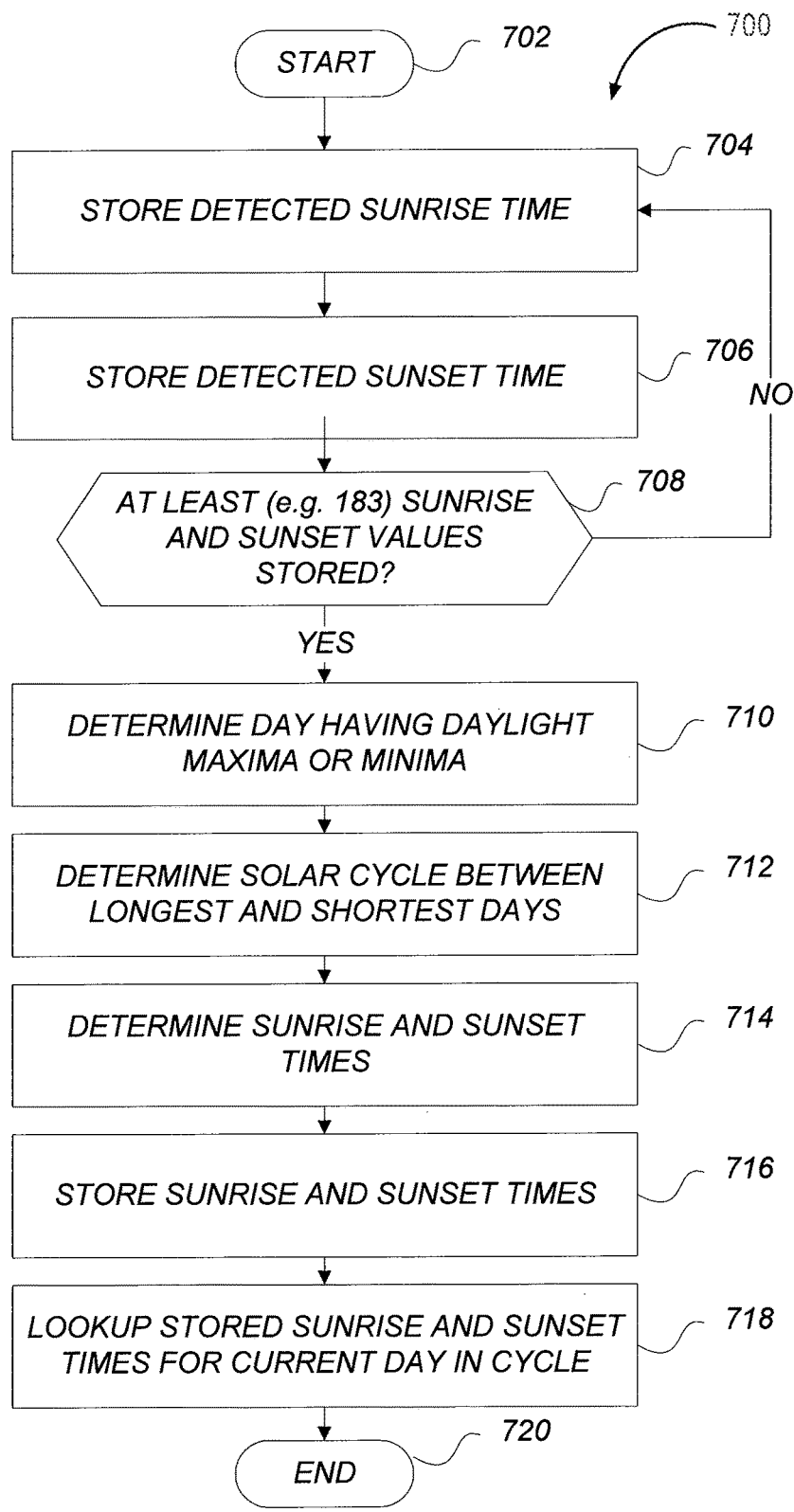
FIG. 7 is a flow diagram showing a low level method of looking up expected sunrise and sunset times using a number of observed sunrise and sunset times to determine an annual sunrise schedule, according to one non-limiting illustrated embodiment.

FIG. 7 shows a low level method 700 of acquiring, storing, and retrieving expected times for solar events such as sunrise, sunset, solar noon, solar midnight and the like. Looked-up solar event times may be used provide the expected value against which at least one aspect of the output signal from the photosensitive transducer 304 is verified at 406. Looked-up solar event times may also provide all or a portion of the schedule used by the microcontroller 314 to alter, adjust or otherwise control one or more aspects of the solid state light sources 308 at 412.

The method 700 uses the photosensitive transducer 304 and a timer circuit 319 or real-time clock circuit 320 to determine chronological data related to (e.g., time and date) of one or more solar events. Data indicative of the solar event and the related chronological information may be at least partially stored in the non-transitory storage media 316. Repeating the acquisition and storage of such data for a period of time can generate a solar event look-up table that takes into account all of the local environmental factors about the luminaire 302 since the look-up table incorporates ambient light data collected by the photosensitive transducer 304. In at least some instances, such look-up tables may provide the expected value for one or more astronomical or solar events against which at least one aspect of the output signal 305 from the photosensitive transducer 304 is compared at 406. Looked-up solar event times may provide all or a portion of the schedule used by the microcontroller 314 to control the flow of power to the light sources at 412.

When the microcontroller 314 is unable to verify or unsuccessful in verifying the output signal 305 provided by the at least one photosensitive transducer 304, the microcontroller 314 can alter, adjust or otherwise control one or more aspects of the solid state light sources 308 using schedule that includes data indicative of relevant solar events. In at least some instances, one or more logical conditions may be combined with the schedule to generate more complex logical instructions, conditions precedent, or conditions subsequent that are stored within the non-transitory storage media 316 and executable by the microcontroller 314. For example, one logical condition provided to the microcontroller 314 may instruct the microcontroller to "turn ON the solid state light source 10 minutes prior to sunset." Another logical condition provided to the microcontroller 314 may instruct the microcontroller to "reduce luminosity of the solid state light source 180 minutes after sunset."

In the absence of a verified output signal from the at least one photosensitive transducer 304, the microcontroller 314 determines one or more aspects of a lighting condition using one or more calculations, one or more schedules, or combinations thereof.

The method commences at 702. At 704 chronological data associated with a sunrise event is collected by the microcontroller 314 and stored within the non-transitory storage media 316. In determining the occurrence of a sunrise event, the microcontroller 314 can examine one or more signal characteristics of the output signal 305 provided by the photosensitive transducer 304. In some instances, the microcontroller 314 may associate an increase in voltage of the output signal 305 with a sunrise event (e.g., an output signal 305 voltage rising above a 1.3 VDC threshold may indicate a sunrise event). In other instances, the microcontroller 314 may associate a rate of increase in voltage of the output signal 305 with a sunrise event (e.g., an output signal 305 voltage rate of increase greater than 0.01 VDC/minute may indicate a sunrise event). Such threshold levels, values, or ranges that are characteristic or otherwise indicative of one or more astronomical or solar events may be provided to the microcontroller 314 from the non-transitory storage media 316 where they are stored either upon manufacture, installation, or configuration.

In addition to the output signal 305, the microcontroller 314 also has access to chronological data. Such chronological data may include, but is not limited to date and time data collected from either a timer circuit 319 or a real time clock circuit 320. In at least some instances, the accuracy of the chronological data provided by the timer circuit 319 or the real time clock circuit 320 may be confirmed against one or more external time-keeping devices. For example, against time and date data available across GSM, CDMA, or 3G cellular networks, or against the system date and time of a portable electronic device used to communicate with the lamp control subsystem 312 via the communications interface 330.

Chronological data that is indicative of the detected time of the sunrise event is stored in the non-transitory storage media 316. Such data may include, for example data indicative of the time and date of the sunrise event (e.g., May 13, 2012, 6:34 A.M.). Such data may optionally include the one or more measured signal parameters of the output signal (e.g., 1.24 VDC voltage level or 0.0133 VDC/minute voltage rise rate).

At 706 chronological data associated with a sunset event is collected by the microcontroller 314 and stored within the non-transitory storage media 316. In determining the occurrence of a sunset event, the microcontroller can examine one or more signal characteristics of the output signal 305 provided by the photosensitive transducer 304. In some instances, the microcontroller 314 may associate a decrease in voltage of the output signal 305 with a sunset event (e.g., an output signal voltage of less than 1.1 VDC may indicate a sunset event). In other instances, the microcontroller 314 may associate a rate of voltage decrease or drop in the output signal 305 with a sunset event (e.g., an output signal voltage decrease greater than 0.01 VDC/minute may indicate a sunset event). Such levels or values may be provided to the microcontroller 314 from the non-transitory storage media 316 where they are stored either upon manufacture, installation, or configuration.

Chronological data that is indicative of the detected time of the sunset event is stored in the non-transitory storage media 316. Such data may include, for example data indicative of the time and date of the sunset event (e.g., May 13, 2012, 7:46 P.M.). Such data may optionally include the one or more measured signal parameters of the output signal (e.g., 1.13 VDC voltage level or 0.0128 VDC/minute voltage drop rate).

At 708 the microcontroller 314 can confirm number ("N") of sunrise and sunset values stored in the non-transitory storage media 316. In at least one embodiment, the microcontroller 314 can confirm whether 183 sets of sunrise and sunset values (i.e., a half-year's worth of sunrise and sunset values) have been stored. If fewer than "N" sunrise and sunset values have been stored at 708, the method returns to 704 to collect an additional set of sunrise and sunset values.

If "N" or greater sunrise and sunset values have been stored at 708, the microcontroller 314 can proceed to 710 to analyze the chronological data stored in the non-transitory storage media 316. Since either the longest day of the year (i.e., the summer solstice) or the shortest day of the year (i.e., the winter solstice) will fall within any contiguous 183 day period, the microcontroller 314 can analyze the chronological data (e.g., by analyzing the change in day length from day-to-day looking for a change in sign in day length) to determine the shortest or longest day in the sequence.

At 712, having determined the longest or shortest day in the sequence at 710, the microcontroller 314 can take the solar data collected during the 91 contiguous days prior or subsequent to the longest or shortest day to determine the solar data for the 182 day cycle between the shortest day of the year and longest day of the year for the geographic location in which the luminaire 302 is mounted. For example, if the 91 contiguous day period is either after the shortest day of the year of before the longest day of the year, the microcontroller 314 can determine the 182 day period of increasing daylight between the shortest day and the longest day in the annual solar cycle. Conversely, if the 91 contiguous day period is either after the longest day of the year of before the shortest day of the year, the microcontroller 314 can determine the 182 day period of decreasing daylight between the longest day and the shortest day in the annual solar cycle.

As a hypothetical example, consider the microprocessor 314 has determined 91 samples subsequent to the shortest day of the year have been collected at 710. At 712, the 91 samples are used to determine the remaining 91 days of increasing daylight between the shortest day of the year and the longest day of the year. If the collected data includes the daylength for each of the 91 days (e.g., daylength[0] to daylength[90]), a sample routine written in pseudo-C code might be implemented as follows to determine the daylength of days 91 to 182:

```
daylength[91] = daylength[90]+|daylength[90] – daylength[89]|
daylength[92] = daylength[91]+|daylength[91] – daylength[90]|
daylength[93] = daylength[91]+|daylength[91] – daylength[89]|
             <continue until>
daylength[181] = daylength[91]+|daylength[91] – daylength[1]|
daylength[182] = daylength[91]+|daylength[91] – daylength[0]|
```

At 714, having determined either the 182 day period of increasing daylight between the shortest day and the longest day in the annual solar cycle or the 182 day period of decreasing daylight between the longest day and the shortest day in the annual solar cycle, the microcontroller can mirror the solar data to determine the 182 day cycle for the remaining portion of the solar year, thereby determining the solar data for a one year period. For example, if the 182 day period of increasing daylight between the shortest day and the longest day in the annual solar cycle is known, mirroring the data across the longest day will provide the 182 day period of decreasing daylight between the longest day and the shortest day. Conversely, if the 182 day period of decreasing daylight between the longest day and the shortest day in the annual solar cycle is known, mirroring the data across the shortest day will provide the 182 day period of increasing daylight between the shortest day and the longest day.

Continuing with the hypothetical example from above, consider the microprocessor 314 has determined the 182 day cycle of increasing daylight between the shortest and longest days of the year. The remaining 182 day cycle of decreasing daylight is simply the reverse order of the calculated 182 day cycle of increasing daylight. A sample routine written in pseudo-C code might be implemented as follows to determine the daylength of days 133 to 364:

```
daylength[183] = daylength[181]
daylength[182] = daylength[180]
    <continue until>
daylength[364] = daylength[0]
```

Having calculated a full year's worth of solar data at 714, at 716 the microprocessor can store all or a portion of the solar data in the non-transitory storage media 316.

After storing a year's worth of solar data in the non-transitory storage media 316 at 718, the microcontroller 314 can proceed at 720 to lookup the expected sunrise or sunset value using, for example, chronological data provided by the timer circuit 318 or the real time clock circuit 320. Such looked-up sunrise or sunset values that have been stored in the non-transitory storage media 316 using the method 700 may be used to provide the "expected value" to which the at least one aspect of the output signal 305 is compared to verify the operation of the photosensitive transducer 304 at 406. Such looked-up sunrise or sunset values that have been stored in the non-transitory storage media 316 may also be used to control one or more aspects (e.g., ON/OFF, luminosity, etc.) of the operation of the at least one solid state light source 308 at 412. The method 700 concludes at 720.

Figure 8:
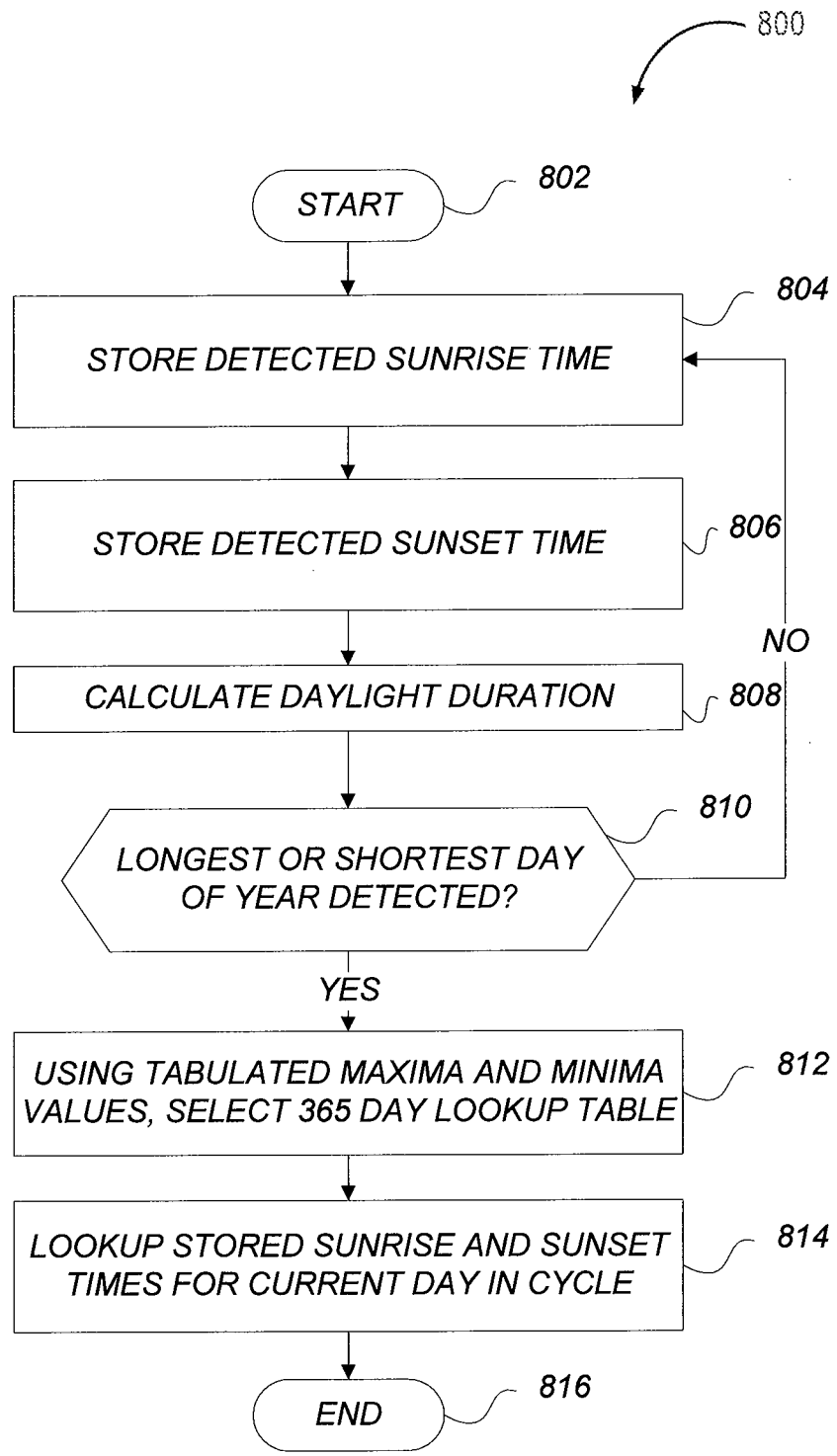
FIG. 8 is a flow diagram showing a low level method of looking up expected sunrise and sunset times using an observed daylight minima and maxima and a number of observed sunrise and sunset times to determine an annual sunrise schedule, according to one non-limiting illustrated embodiment.

FIG. 8 shows a low level method 800 of acquiring, storing, and retrieving expected times for solar events such as sunrise, sunset, solar noon, solar midnight and the like. Looked-up solar event times may be used provide the expected value against which at least one aspect of the output signal from the photosensitive transducer 304 is verified at 406. Looked-up solar event times may also provide all or a portion of the schedule used by the microcontroller 314 to control the flow of power to the light sources at 412.

The method 800 uses the photosensitive transducer 304 and a timer 316 or real-time clock circuit 320 to determine the chronological data (e.g., time and date) of one or more daily solar events. In at least some instances, the microcontroller can evaluate a calculated daylength value based on measured sunrise and sunset data provided by the at least one photosensitive transducer 304 to detect the shortest or longest day of the year. The duration of the longest and shortest days of the year are a function of the latitude of the observer. Determining the duration of the longest or shortest day (using, for example, the output signals 305 provided by the photosensitive transducer 304) allows the microcontroller 314 to lookup the duration in a table of values stored in the non-transitory storage media 316 thereby determining the latitude of the luminaire 302. Once the microprocessor 314 determines the latitude, a table of solar data appropriate for the latitude may be retrieved from the non-transitory storage media 314 or via the communications interface 330 from an external non-transitory storage media 316.

Looked-up solar event times may provide the expected value against which the at least one aspect of the output signal 305 from the photosensitive transducer 304 is compared at 406. Looked-up solar event times may provide all or a portion of the schedule used by the microcontroller 314 to alter, adjust or otherwise control one or more aspects of the at least one solid state light source 308 at 412.

When the microcontroller 314 is unable to verify or unsuccessful in verifying the output signal 305 provided by the at least one photosensitive transducer 304, the microcontroller 314 can control the operation of the solid state light source using schedule that includes data indicative of relevant solar events. In at least some instances, one or more logical conditions may be combined with the schedule to generate more complex logical instructions, conditions precedent, or conditions subsequent that are stored within the non-transitory storage media 316 and executable by the microcontroller 314. For example, one logical condition provided to the microcontroller 314 may instruct the microcontroller to "turn ON the solid state light source 10 minutes prior to sunset." Another logical condition provided to the microcontroller 314 may instruct the microcontroller to "reduce luminosity of the solid state light source 180 minutes after sunset."

In the absence of a verified output signal from the at least one photosensitive transducer 304, the microcontroller 314 determines one or more aspects of a lighting condition using one or more calculations, one or more schedules, or combinations thereof.

The method commences at 802. At 804 chronological data associated with a sunrise event is collected by the microcontroller 314 and stored within the non-transitory storage media 316. In determining the occurrence of a sunrise event, the microcontroller 314 can examine one or more signal characteristics of the output signal 305 provided by the photosensitive transducer 304. In some instances, the microcontroller 314 may associate an increase in voltage of the output signal 305 with a sunrise event (e.g., an output signal 305 voltage rising above a 1.3 VDC threshold may indicate a sunrise event). In other instances, the microcontroller 314 may associate a rate of increase in voltage of the output signal 305 with a sunrise event (e.g., an output signal 305 voltage rate of increase greater than 0.01 VDC/minute may indicate a sunrise event). Such threshold levels, values, or ranges that are characteristic or otherwise indicative of one or more astronomical or solar events may be provided to the microcontroller 314 from the non-transitory storage media 316 where they are stored either upon manufacture, installation, or configuration.

In addition to the output signal 305, the microcontroller 314 also has access to chronological data. Such chronological data may include, but is not limited to date and time data collected from either a timer circuit 319 or a real time clock circuit 320. In at least some instances, the accuracy of the chronological data provided by the timer circuit 319 or the real time clock circuit 320 may be confirmed against one or more external time-keeping devices. For example, against time and date data available across GSM, CDMA, or 3G cellular networks, or against the system date and time of a portable electronic device used to communicate with the lamp control subsystem 312 via the communications interface 330.

Chronological data that is indicative of the detected time of the sunrise event is stored in the non-transitory storage media 316. Such data may include, for example data indicative of the time and date of the sunrise event (e.g., May 13, 2012, 6:34 A.M.). Such data may optionally include the one or more measured signal parameters of the output signal (e.g., 1.24 VDC voltage level or 0.0133 VDC/minute voltage rise rate).

At 806 chronological data associated with a sunset event is collected by the microcontroller 314 and stored within the non-transitory storage media 316. In determining the occurrence of a sunset event, the microcontroller can examine one or more signal characteristics of the output signal 305 provided by the photosensitive transducer 304. In some instances, the microcontroller 314 may associate a decrease in voltage of the output signal 305 with a sunset event (e.g., an output signal voltage of less than 1.1 VDC may indicate a sunset event). In other instances, the microcontroller 314 may associate a rate of voltage decrease or drop in the output signal 305 with a sunset event (e.g., an output signal voltage decrease greater than 0.01 VDC/minute may indicate a sunset event). Such levels or values may be provided to the microcontroller 314 from the non-transitory storage media 316 where they are stored either upon manufacture, installation, or configuration.

Chronological data that is indicative of the detected time of the sunset event is stored in the non-transitory storage media 316. Such data may include, for example data indicative of the time and date of the sunset event (e.g., May 13, 2012, 7:46 P.M.). Such data may optionally include the one or more measured signal parameters of the output signal (e.g., 1.13 VDC voltage level or 0.0128 VDC/minute voltage drop rate).

At 808 the microcontroller 314 can determine the daylight duration existent between the time of the measured sunrise stored at 804 and the time of the measured sunset stored at 806.

At 810 the microcontroller 314 can determine whether the daylight duration calculated at 808 is indicative of the longest or the shortest day of the year. Such an indication may be provided by comparing the determined daylight duration to one or more preceding durations. For example, an increase in daylight duration between days 1 and 2 and a decrease in daylight duration between days 2 and 3 would indicate day 2 is the longest day of the year. Conversely, a decrease in daylight duration between days 1 and 2 and an increase in daylight duration between days 2 and 3 would indicate day 2 is the shortest day of the year. If the microcontroller 314 determines that the longest or shortest day of the year has not been detected at 810, then the method 800 returns to 804 for collection of additional sunrise and sunset data until the longest or shortest day of the year is detected.

If the microcontroller 314 determines that the longest or shortest day of the year has been detected at 810, the daylight duration is compared to the respective values of the longest and shortest day daylight durations stored in the non-transitory storage medium 316. Using the duration of the longest or shortest day, the latitude of the luminaire may be determined and an appropriate 365 day look-up table selected at 812.

After selecting the appropriate look-up table at 812, the microcontroller 314 can proceed at 814 to lookup the expected sunrise or sunset value. Such looked-up sunrise or sunset values may be used to provide the "expected value" to which the at least one aspect of the output signal 305 is compared to verify the operation of the photosensitive transducer 304 at 406. Such looked-up sunrise or sunset values that have been stored in the non-transitory storage media 316 may be used to alter, adjust, or otherwise control one or more aspects (e.g., ON/OFF, luminosity, etc.) of the operation of the at least one solid state light source 308 at 412. The method 800 concludes at 816.

Figure 9:
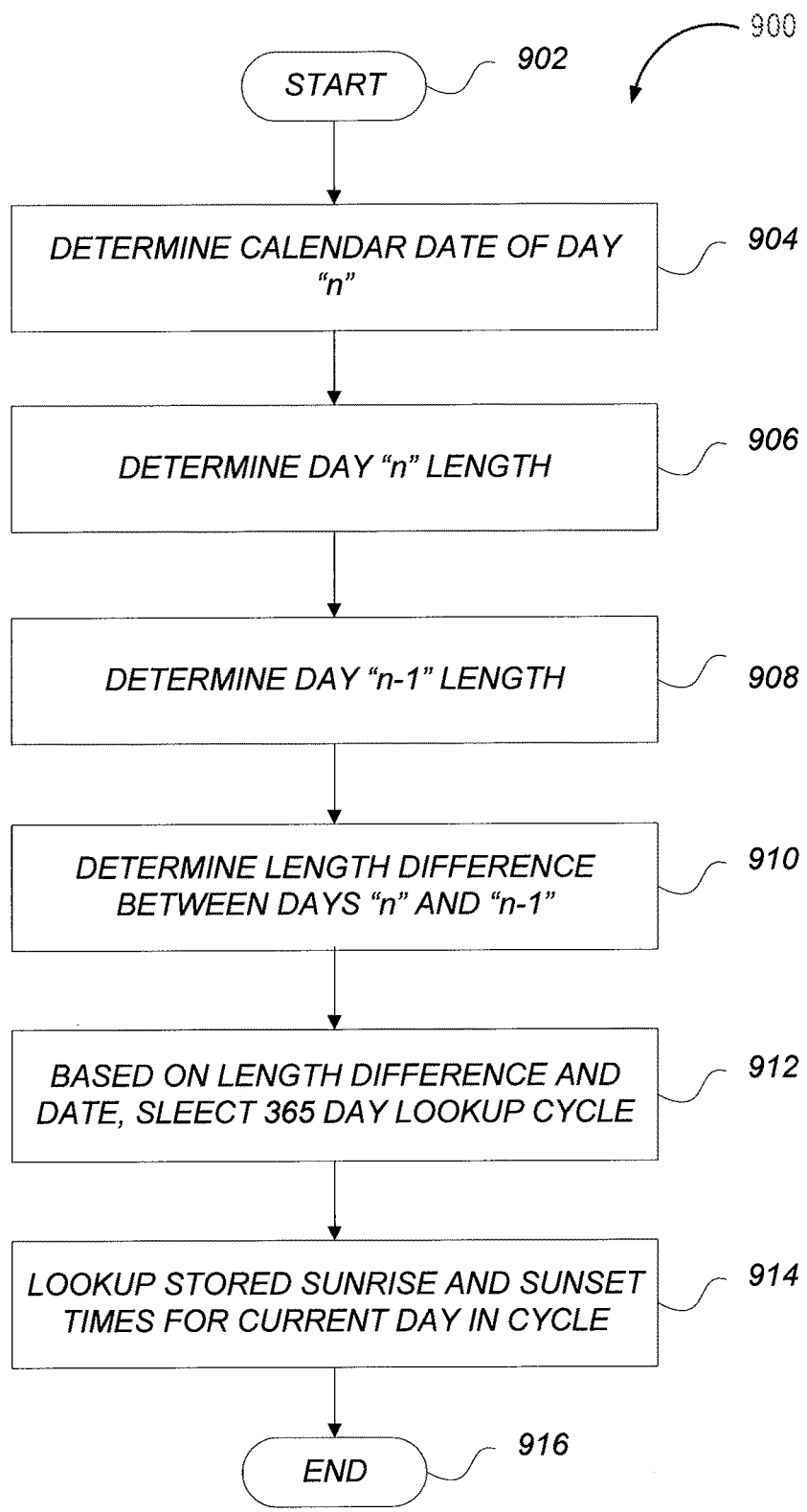
FIG. 9 is a flow diagram showing a low level method of looking up expected sunrise and sunset times using an observed day length and date to determine an annual sunrise schedule, according to one non-limiting illustrated embodiment.

FIG. 9 shows a low level method 900 of acquiring, storing, and retrieving expected times for solar events such as sunrise, sunset, solar noon, solar midnight and the like. Looked-up solar event times may be used provide the expected value against which at least one aspect of the output signal from the photosensitive transducer 304 is verified at 406. Looked-up solar event times may also provide all or a portion of the schedule used by the microcontroller 314 to control the flow of power to the light sources at 412.

The method 900 uses the photosensitive transducer 304 and a timer circuit 319 or real-time clock circuit 320 to determine the chronological data (e.g., time and date) of one or more daily solar events. In at least some instances, the microcontroller 314 can evaluate a calculated day length value based on measured sunrise and sunset data provided by the at least one photosensitive transducer 304 for sequential calendar days. Based on date information for the two sequential calendar days provided by either the timer circuit 318 or the real time clock circuit 320 and the change in duration between the sequential calendar days, the microprocessor 314 can determine the latitude and select an appropriate 365 day look-up table for the luminaire 302. In at least some instances, once the microprocessor 314 determines the latitude, a table of solar data appropriate for the latitude may be selected and retrieved from the non-transitory storage media 314 or via the communications interface 330 from an external non-transitory storage media 316.

Looked-up solar event times may provide the expected value against which at least one aspect of the output signal from the photosensitive transducer 304 is compared at 406. Looked-up solar event times may provide all or a portion of the schedule used by the microcontroller 314 to control one or more aspects of the at least one solid state light sources 308 at 412.

When the microcontroller 314 is unable to verify or unsuccessful in verifying the output signal 305 provided by the at least one photosensitive transducer 304, the microcontroller 314 can control the operation of the solid state light source using schedule that includes data indicative of relevant solar events. In at least some instances, one or more logical conditions may be combined with the schedule to generate more complex logical instructions, conditions precedent, or conditions subsequent that are stored within the non-transitory storage media 316 and executable by the microcontroller 314. For example, one logical condition provided to the microcontroller 314 may instruct the microcontroller to "turn ON the solid state light source 10 minutes prior to sunset." Another logical condition provided to the microcontroller 314 may instruct the microcontroller to "reduce luminosity of the solid state light source 180 minutes after sunset."

In the absence of a verified output signal from the at least one photosensitive transducer 304, the microcontroller 314 determines one or more aspects of a lighting condition using one or more calculations, one or more schedules, or combinations thereof.

The method 900 commences at 902. At 904, the current date is determined. Data indicative of the date may be obtained by the microprocessor 314 from the timer circuit 318 or the real time clock circuit 320.

At 906, based on the measured sunrise and sunset as determined using the output signal 305 from the photosensitive transducer 304, the length of the present day is calculated. Data indicative of the length of the present day can be stored in the non-transitory storage media 316.

At 908, the microcontroller 314 determines the day length of the previous day. In at least some instances, the microcontroller can retrieve the data indicative of the preceding day length from the non-transitory storage media 316.

At 910, the difference in the day length between the current day and the previous day is determined by the microcontroller 314.

At 912, using the data indicative of the current date that was obtained at 904 and the calculated difference in day length that was determined at 910, the microprocessor determines the latitude of the luminaire 302. Since the annual solar cycle is a function of latitude, by determining the latitude at 912, the microcontroller 314 can select the appropriate annual solar calendar for the luminaire 302.

After selecting the appropriate annual solar calendar at 912, the microcontroller 314 can proceed at 914 to lookup the expected sunrise or sunset value for any day in the solar cycle. Such looked-up sunrise or sunset values may be used to provide the "expected value" to which the at least one aspect of the output signal 305 is compared to verify the operation of the photosensitive transducer 304 at 406. Such looked-up sunrise or sunset values that have been stored in the non-transitory storage media 316 may be used to control one or more aspects (e.g., ON/OFF, luminosity, etc.) of the operation of the at least one solid state light source 308 at 412.

The method 900 advantageously minimizes the reliance on data provided by the number of output signals 305 from the photosensitive transducer 304 in selecting the appropriate solar calendar for the luminaire 302. Although only two days worth of solar data are required to select the solar calendar for the luminaire 302, additional days of data collection may improve the accuracy of selection by minimizing the effects of ambient, geographic or atmospheric conditions or disturbances on the day length determination performed by the microcontroller at 906. For example, collection of solar data over a 7-28 day period may be sufficient to improve the accuracy of the selection of the solar calendar by the microprocessor 314. The method 900 concludes at 916.

Figure 10:
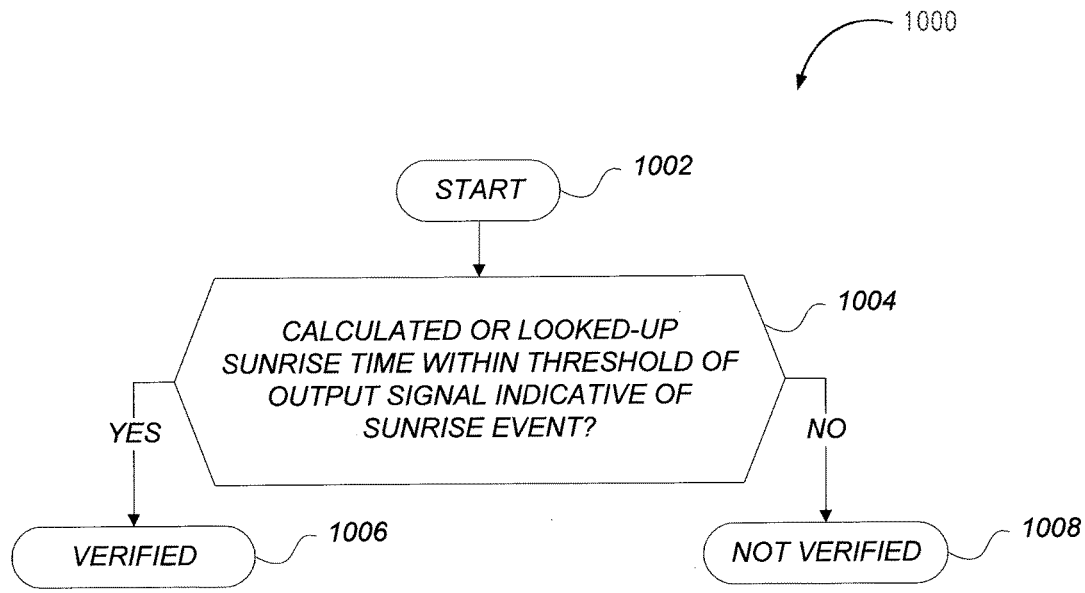
FIG. 10 is a flow diagram showing a low level method of determining whether input received from a photosensor has been verified using an expected sunrise event, according to one non-limiting illustrated embodiment.

FIG. 10 shows a low level method 1000 of a method useful in performing at least a portion of the photosensitive transducer output signal 305 verification at 408. One or more aspects of operation of the at least one solid state light source 308 in the luminaire 302 may be controlled using the photosensitive transducer 304 upon verification of the output signal 305 by the microcontroller 314 at 408. If the microprocessor 314 is unable to verify the output signal 305 at 408, then a schedule, for example a calculated schedule such as that described in FIG. 4 or a looked-up schedule such as those described in FIGS. 5 to 9 may be used to control one or more aspects of operation of the at least one solid state light source 308 in the luminaire 302.

Detection of a failed or malfunctioning photosensitive transducer 304 can improve the energy efficiency of a luminaire 302, for example by turning off the solid state light source during scheduled daylight hours. The use of the microcontroller 314 rather than the photosensitive transducer 304 to alter, adjust or otherwise control one or more operational aspects of the solid state light source 308 provides operational benefits. For example, use of the microcontroller 314 advantageously permits both the imposition of logic to determine if the photosensitive transducer 304 has failed and permits the operation of the solid state light source 308 according to one or more calculated or looked-up solar schedules in the event the photosensitive transducer 304 fails. Such operation reduces both material and labor costs in repairing or replacing failed photosensitive transducers 304 since the solid state light source will continue to operate based on a schedule even if the photosensitive transducer 304 has failed. In some instances, upon detection of a failed photosensitive transducer 304, the microprocessor 314 can provide one or more error messages via the communications interface 330 to alert service or maintenance personnel of the failure.

The method 1000 commences at 1002. At 1004 the microcontroller 314 can compare the calculated (FIG. 4) or looked-up (FIGS. 5 to 9) sunrise time with the output signal 305 provided by the photosensitive transducer 304. In at least some instances, the time of receipt of an output signal 305 having one or more appropriate aspects of a sunrise event may be compared to the calculated or looked up value. If the aspect of the output signal 305 falls within a threshold of the calculated or looked up value (e.g., an output signal 305 indicative of a sunrise event is received at 6:42 AM, the threshold is +/−15 minutes and the calculated or looked-up sunrise time is 6:33 AM), the operation of the photosensitive transducer 304 is verified at 1006 by the microcontroller 314 and the operation of one or more aspects of the solid state light source 308 is controlled by the microcontroller 314 based on all or a portion of the output signal 305 at 410.

If the aspect of the output signal 305 falls outside a threshold of the calculated or looked up value (e.g., an output signal 305 indicative of a sunrise event is received at 6:42 AM, the threshold is +/−15 minutes and the calculated or looked-up sunrise time is 6:04 AM), the operation of the photosensitive transducer 304 is not verified at 1008 by the microcontroller 314 and the operation of one or more aspects of the solid state light source 308 is controlled by the microcontroller 314 based on all or a portion of the calculated or looked-up solar schedule at 412.

Figure 11:
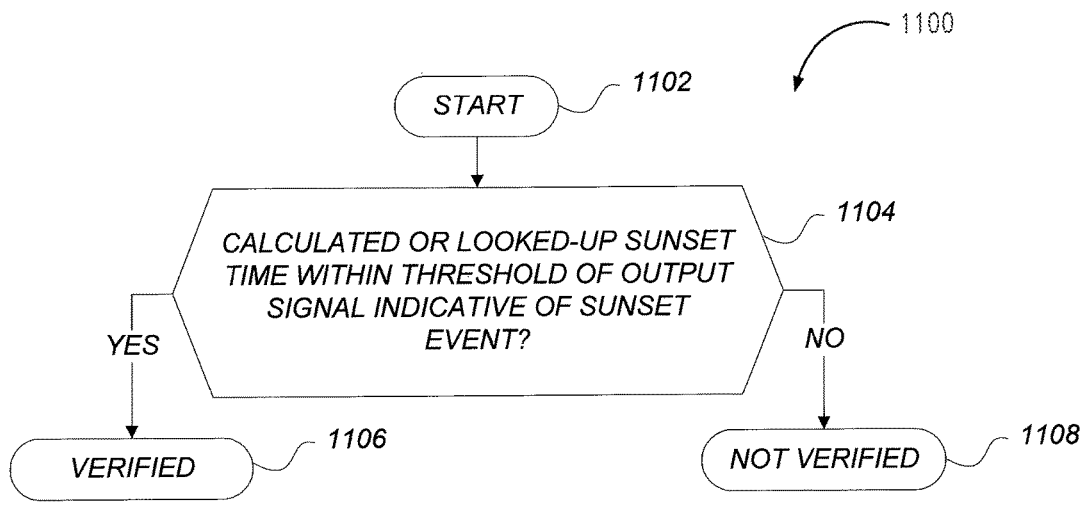
FIG. 11 is a flow diagram showing a low level method of determining whether input received from a photosensor has been verified using an expected sunset event, according to one non-limiting illustrated embodiment.

FIG. 11 shows a low level method 1100 of a method useful in performing at least a portion of the photosensitive transducer output signal 305 verification at 408. One or more aspects of operation of the at least one solid state light source 308 in the luminaire 302 may be controlled using the photosensitive transducer 304 upon verification of the output signal 305 by the microcontroller 314 at 408. If the microprocessor 314 is unable to verify the output signal 305 at 408, then a schedule, for example a calculated schedule such as that described in FIG. 4 or a looked-up schedule such as those described in FIGS. 5 to 9 may be used to control one or more aspects of operation of the at least one solid state light source 308 in the luminaire 302.

The method 1100 commences at 1102. At 1104 the microcontroller 314 can compare the calculated (FIG. 4) or looked-up (FIGS. 5 to 9) sunset time with the output signal 305 provided by the photosensitive transducer 304. In at least some instances, the time of receipt of an output signal 305 having one or more appropriate aspects of a sunset event may be compared to the calculated or looked up value. If the aspect of the output signal 305 falls within a threshold of the calculated or looked up value (e.g., an output signal 305 indicative of a sunset event is received at 7:08 PM, the threshold is +/−15 minutes and the calculated or looked-up sunset time is 7:04 PM), the operation of the photosensitive transducer 304 is verified at 1106 by the microcontroller 314 and the operation of one or more aspects of the solid state light source 308 is controlled by the microcontroller 314 based on all or a portion of the output signal 305 at 410.

If the aspect of the output signal 305 falls outside a threshold of the calculated or looked up value (e.g., an output signal 305 indicative of a sunset event is received at 7:08 PM, the threshold is +/−15 minutes and the calculated or looked-up sunset time is 8:16 PM), the operation of the photosensitive transducer 304 is not verified at 1108 by the microcontroller 314 and the operation of one or more aspects of the solid state light source 308 is controlled by the microcontroller 314 based on all or a portion of the calculated or looked-up solar schedule at 412.

Figure 12:
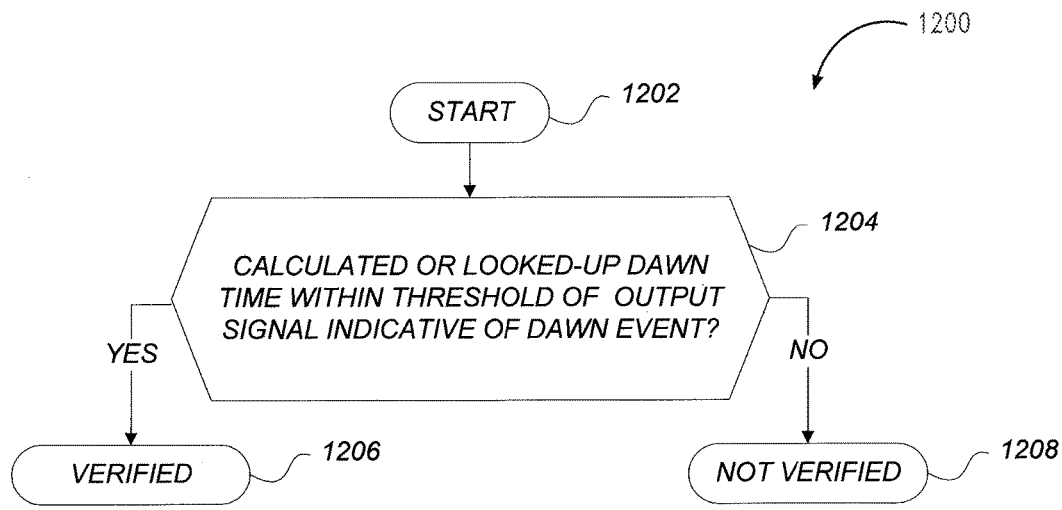
FIG. 12 is a flow diagram showing a low level method of determining whether input received from a photosensor has been verified using an expected dawn event, according to one non-limiting illustrated embodiment.

FIG. 12 shows a low level method 1200 of a method useful in performing at least a portion of the photosensitive transducer output signal 305 verification at 408. One or more aspects of operation of the at least one solid state light source 308 in the luminaire 302 may be controlled using the photosensitive transducer 304 upon verification of the output signal 305 by the microcontroller 314 at 408. If the microprocessor 314 is unable to verify the output signal 305 at 408, then a schedule, for example a calculated schedule such as that described in FIG. 4 or a looked-up schedule such as those described in FIGS. 5 to 9 may be used to control one or more aspects of operation of the at least one solid state light source 308 in the luminaire 302.

The method 1200 commences at 1202. At 1204 the microcontroller 314 can compare the calculated (FIG. 4) or looked-up (FIGS. 5 to 9) dawn event with the output signal 305 provided by the photosensitive transducer 304. In at least some instances, the time of receipt of an output signal 305 having one or more appropriate aspects of a dawn event may be compared to the calculated or looked up value. If the aspect of the output signal 305 falls within a threshold of the calculated or looked up value (e.g., an output signal 305 indicative of a dawn event is received at 6:14 AM, the threshold for the dawn event is +1-20 minutes and the calculated or looked-up sunrise time is 6:01 AM), the operation of the photosensitive transducer 304 is verified at 1206 by the microcontroller 314 and the operation of one or more aspects of the solid state light source 308 is controlled by the microcontroller 314 based on all or a portion of the output signal 305 at 410. For example, responsive to the verified detection of a dawn event by the lamp control subsystem 312, the microcontroller 314 may reduce the power flow or duty cycle of the at least one solid state light source 308.

If the aspect of the output signal 305 falls outside a threshold of the calculated or looked up value (e.g., an output signal 305 indicative of a dawn event is received at 6:43 AM, the threshold is +/−20 minutes and the calculated or looked-up sunrise time is 6:01 AM), the operation of the photosensitive transducer 304 is not verified at 1208 by the microcontroller 314 and the operation of one or more aspects of the solid state light source 308 is controlled by the microcontroller 314 based on all or a portion of the calculated or looked-up solar schedule at 412.

Figure 13:
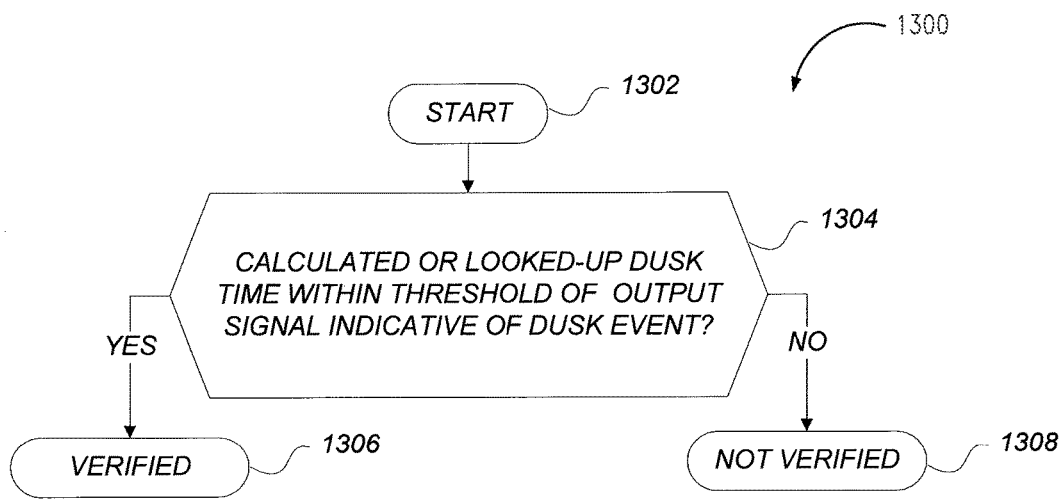
FIG. 13 is a flow diagram showing a low level method of determining whether input received from a photosensor has been verified using an expected dusk event, according to one non-limiting illustrated embodiment.

FIG. 13 shows a low level method 1300 of a method useful in performing at least a portion of the photosensitive transducer output signal 305 verification at 408. One or more aspects of operation of the at least one solid state light source 308 in the luminaire 302 may be controlled using the photosensitive transducer 304 upon verification of the output signal 305 by the microcontroller 314 at 408. If the microprocessor 314 is unable to verify the output signal 305 at 408, then a schedule, for example a calculated schedule such as that described in FIG. 4 or a looked-up schedule such as those described in FIGS. 5 to 9 may be used to control one or more aspects of operation of the at least one solid state light source 308 in the luminaire 302.

The method 1300 commences at 1302. At 1304 the microcontroller 314 can compare the calculated (FIG. 4) or looked-up (FIGS. 5 to 9) sunset time with the output signal 305 provided by the photosensitive transducer 304. In at least some instances, the time of receipt of an output signal 305 having one or more appropriate aspects of a dusk event may be compared to the calculated or looked up value. If the aspect of the output signal 305 falls within a threshold of the calculated or looked up value (e.g., an output signal 305 indicative of a dusk event is received at 7:08 PM, the threshold is +/−20 minutes and the calculated or looked-up sunset time is 7:04 PM), the operation of the photosensitive transducer 304 is verified at 1306 by the microcontroller 314 and the operation of one or more aspects of the solid state light source 308 is controlled by the microcontroller 314 based on all or a portion of the output signal 305 at 410.

If the aspect of the output signal 305 falls outside a threshold of the calculated or looked up value (e.g., an output signal 305 indicative of a dusk event is received at 7:08 PM, the threshold is +/−20 minutes and the calculated or looked-up sunset time is 8:16 PM), the operation of the photosensitive transducer 304 is not verified at 1308 by the microcontroller 314 and the operation of one or more aspects of the solid state light source 308 is controlled by the microcontroller 314 based on all or a portion of the calculated or looked-up solar schedule at 412.

In the various methods discussed above with reference to FIGS. 4 to 13, the control subsystem may incorporate one or more electrical or logical filters to reduce or eliminate the effect of aberrant conditions in the output signal 305 provided by the photosensitive transducer 304. Such aberrant conditions may be caused by the appearance or disappearance of artificial light from the environment. Thus, the control subsystem may filter out an event where a sensor detects artificial light (e.g., from a passing vehicle or some other source) that is sufficiently bright to exceed previously sensed levels and/or based on that event occurring too soon or too late in a daily cycle. The control subsystem may ignore samples where the signal indicates a sensed level of light that exceeds and/or falls below some threshold level of light. The threshold level of light may be the same or similar to the turn ON and/or turn OFF thresholds. Likewise, the control subsystem may ignore samples where timing of the event in the current daily cycle is outside of a defined threshold of the average or median time period. The control subsystem 312 may discard or ignore levels and logically associated times for any such events. Such may consist of not storing corresponding information to the non-volatile storage media 316. Such filtering may, for example, result in the discard of output signal 305 data indicative of a car's headlights on the photosensitive transducer 304 at 2:00 AM. Such may additionally or alternatively include adjusting or not adjusting a pointer to a location in non-transitory storage media 316, accordingly, or otherwise omitting such information from the determination of any average or median.

Additionally, or alternatively, the control subsystem 312 may set a condition flag to indicate that an aberrant condition was detected. The condition flag may cause the control subsystem 312 to enter a teaching or training cycle during the next daily cycle.

The control subsystem 312 may perform a teaching or training cycle on initially starting up the retrofit or integral control subsystem for the first time or after a period of disuse. Additionally, or alternatively, the control subsystem 312 may perform a teaching or training cycle from time to time, for instance in response to detection of an aberrant condition. The teaching or training cycle may take place over a single daily cycle or over two or more daily cycles.

At various times during a daily cycle the control subsystem 312 may determine levels of light or illumination sensed in the ambient environment about the luminaire 302. The control subsystem 312 stores information indicative of the determined amount of time to the non-transitory storage media 316. The control subsystem 312 may repeat the determining and storing cycle until some defined number of samples has been stored (e.g., 365 daily sunrise/sunset cycles in FIG. 5 or 183 daily sunrise/sunset cycles in FIG. 6) to the non-transitory storage media. During the teaching or training cycle, the control subsystem 312 may maintain the level of light output by the at least one solid-state light source 308 at a constant luminosity (e.g., relatively high). Such ensures that adequate light is provided at all hours that the at least one solid-state light source 308 is ON, until sufficient samples are acquired to reliably predict how long after turn ON the at least one solid-state light source 308 will be turned OFF, or the level of light or illumination output by the at least one solid-state light source 308 reduced and/or increased. Alternatively, the control subsystem may employ a defined limited duration for the reduced level of light, until sufficient samples are acquired. Such duration should be set conservatively, to not be longer (e.g., 1 hour) than what can safely be anticipated as the period when reduced light levels are acceptable.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other contexts, not necessarily the exemplary context of controlling operations of an illumination system generally described above.

For example, while the illumination systems are generally described above as embodied in a luminaire, the control subsystem may control multiple luminaires. As used herein and in the claims, "luminaire" is used in its broadest sense to refer to any lighting fixture or structure. While a single step adjustment downward and upward in the level of illumination has been described and illustrated, illumination level may be adjusted in multiple steps, or even continuously to gradually ramp downward some time after turning ON the light source, then eventually back upward some time before turning OFF the light source. Additionally, or alternatively, the embodiments described herein may be combined with motion or proximity detecting, either as implemented by a luminaire control mechanism or by a retrofit or integral control subsystem.

The microcontroller 314 may be programmable and may include one or more input ports (not illustrated) through which a user can program the microcontroller 314. For example, the time delays and the various illumination levels of the at least one solid-state light source 308 may be programmed. The input port may include switches and/or potentiometers that can be set to program the microcontroller 314. Alternatively, the input port may include an electrical interface for the user to remotely program the microcontroller 314 whether through a wire or wirelessly. In one embodiment, the input port may be the ambient light sensor which is connected to the microcontroller 314. In one embodiment, the microcontroller 314 is programmable optically via one or more images captured by an image capture device or imager (not illustrated). In one embodiment, printed barcode pages are used to set delay times and other parameters used by the microcontroller 314. The microcontroller 314 may also receive a one-bit input via the input port to activate or deactivate the light source. For example, a binary bit of "0" turns OFF the light source 104 and a binary bit of "1" turns ON the light source.

Also for example, the various methods may include additional acts, omit some acts, and may perform the acts in a different order than set out in the various flow diagrams. The use of ordinals such as first, second and third, do not necessarily imply a ranked sense of order, but rather may only distinguish between multiple instances of an act or structure.

Also for example, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by one or more controllers (e.g., microcontrollers), as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure. For example, the control subsystem may include an analog electronic delay circuit such as a capacitor based timer circuit with defined delay times, to implement one or more of the specific adjustment times (e.g., times as indicated by the clock when light sources will be turned ON, decreased output, increased output, turned OFF).

When logic is implemented as software and stored in memory, logic or information can be stored on any computer-readable medium for use by or in connection with any processor-related system or method. In the context of this disclosure, a memory is a computer-readable storage medium that is an electronic, magnetic, optical, or other physical device or means that non-transitorily contains or stores a computer and/or processor program. Logic and/or information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Pat. No. 8,118,456; U.S. Patent Publication No. US 2009/0284155, published Nov. 19, 2009; U.S. Patent Publication No. US 2010/0090577, published Apr. 15, 2010; U.S. Provisional Patent Application No. 61/052,924, filed May 13, 2008; U.S. Provisional Patent Application No. 61/088,651, filed Aug. 13, 2008; U.S. Provisional Patent Application No. 61/154,619, filed Feb. 23, 2009; U.S. Provisional Patent Application No. 61/180,017, filed May 20, 2009; U.S. Provisional Patent Application No. 61/229,435, filed Jul. 29, 2009; U.S. Non-Provisional patent application Ser. No. 12/619,535, filed Nov. 16, 2009; U.S. Provisional Patent Application No. 61/295,519 filed Jan. 15, 2010; U.S. Non-Provisional patent application Ser. No. 12/769,956, filed Apr. 29, 2010; U.S. Provisional Patent Application Ser. No. 61/333,983, filed May 12, 2010; U.S. Nonprovisional patent application Ser. No. 12/784,091, filed May 20, 2010; U.S. Provisional Patent Application Ser. No. 61/346,263, filed May 19, 2010; and U.S. Nonprovisional patent application Ser. No. 13/558,191, filed Jul. 25, 2012 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A luminaire, comprising:
    at least one solid state light source;
    at least one photosensitive transducer responsive to at least one physical characteristic indicative of at least one light condition in an ambient environment;
    a lamp control subsystem comprising at least one controller and at least one non-transitory processor-readable medium, the lamp control subsystem communicatively coupled to the photosensitive transducer to receive light condition signals indicative of the at least one light condition in the ambient environment sensed by the photosensitive transducer, the lamp control subsystem which:
        determines an expected time for at least a first daily event, the first daily event associated with a respective first illumination condition in the ambient environment;
        detects an illumination condition in the ambient environment that matches the first illumination condition;
        in response to detection of the illumination condition in the ambient environment that matches the first illumination condition, verifies whether a time of detection of the detected illumination condition that matches the first illumination condition is within a threshold of an expected time for the respective first daily event;
        if verified, controls a supply of power to the at least one solid state light source responsive at least in part to the light condition signals from the photosensitive transducer; and
        if not verified, controls a supply of power to the at least one solid state light source according to a schedule, and not according to the light condition signals from the photosensitive transducer.

2. The luminaire of claim 1 wherein the first daily event is a sunrise event.

3. The luminaire of claim 1 wherein the first daily event is a sunset event.

4. The luminaire of claim 1 wherein the lamp control subsystem further:
    determines an expected time for at least a second daily event, the second daily event associated with a respective second illumination condition in the ambient environment;
    detects an illumination condition in the ambient environment that matches the second illumination condition;
    in response to detection of the illumination condition in the ambient environment that matches the second illumination condition, verifies whether a time of detection of the detected illumination condition that matches the second illumination condition is within a threshold of an expected time for the respective second daily event;
    if verified, controls a supply of power to the at least one solid state light source responsive at least in part to the light condition signals from the photosensitive transducer; and
    if not verified, controls a supply of power to the at least one solid state light source according to a schedule.

5. The luminaire of claim 4 wherein the first daily event is a sunrise event and the second daily event is a sunset event.

6. The luminaire of claim 5 wherein the sunrise event is associated with a sunrise illumination level value indicative of a level of illumination in the ambient environment at the sunrise event and the sunset event is associated with a sunset illumination level value indicative of a level of illumination in the ambient environment at the sunset event.

7. The luminaire of claim 6 wherein the lamp control subsystem verifies whether the time of detection of the at least one light condition surpassing the sunrise illumination level value is within a defined threshold of an expected time for the sunrise event and verifies whether the time of detection of the at least one light condition falling below the sunset illumination level value is within a defined threshold of an expected time for the sunset event.

8. The luminaire of claim 4 wherein the control subsystem verifies whether a duration of time between the time of detection of the illumination condition in the ambient environment that matches the first illumination condition and the time of detection of the illumination condition in the ambient environment that matches the second illumination condition within a defined threshold of an expected duration of time between the expected time for the first daily event and the expected time for the second daily event.

9. The luminaire of claim 1 wherein the non-transitory processor-readable medium stores a schedule of expected times of occurrence of the first daily event and at least a second daily event, the second daily event different from the first daily event, where the expected times of occurrence vary throughout a year.

10. The luminaire of claim 9 wherein the schedule is a year-long schedule which includes a respective expected sunset time and a respective expected sunrise time for each of a plurality of days.

11. The luminaire of claim 10 wherein the controller calculates the respective expected sunset time and a respective expected sunrise time for each of a plurality of days.

12. The luminaire of claim 1, further comprising:
a communications interface to communicably couple the lamp control subsystem to one or more external devices from which the lamp control subsystem can obtain data indicative of at least one of: a software update, a firmware update, one or more executable instruction sets, data indicative of a current date, data indicative of a current time, data indicative of an approximate longitude of the luminaire, or data indicative of an approximate latitude of the luminaire.

13. The luminaire of claim 1 wherein the lamp control subsystem further includes at least one solid state power switch coupled to the solid state light source and operably controlled at least in part by the lamp control subsystem.

14. The luminaire of claim 13 wherein the solid state power switch adjusts a luminous output of the solid state light source responsive to the receipt of a pulse wave modulated signal; and wherein the lamp control subsystem generates the pulse wave modulated signal responsive to the signals indicative of the at least one light condition sensed by the photosensitive transducer.

15. A method of controlling the operation of a solid state light source, the method comprising:
determining, by a controller, an expected time for at least a first daily event, the first daily event associated with a respective first illumination condition in the ambient environment;
detecting an illumination condition in the ambient environment that matches the first illumination condition;
in response to detection of the illumination condition in the ambient environment that matches the first illumination condition, verifying, by the controller, whether a time of detection of the detected illumination condition that matches the first illumination condition is within a threshold of an expected time for the respective first daily event;
if verified, controlling a supply of power to the at least one solid state light source responsive at least in part to the light condition signals from the photosensitive transducer; and
if not verified, controlling a supply of power to the at least one solid state light source according to a schedule, and not according to the light condition signals from the photosensitive transducer.

16. The method of claim 15 wherein determining an expected time for at least a first daily event includes determining an expected time for a sunrise event.

17. The method of claim 15 wherein determining an expected time for at least a first daily event includes determining an expected time for a sunset event.

18. The method of claim 15, further comprising:
determining, by the controller, an expected time for at least a second daily event, the second daily event associated with a respective second illumination condition in the ambient environment;
detecting an illumination condition in the ambient environment that matches the second illumination condition;
in response to detection of the illumination condition in the ambient environment that matches the second illumination condition, verifying, by the controller, whether a time of detection of the detected illumination condition that matches the second illumination condition is within a threshold of an expected time for the respective second daily event;
if verified, controlling a supply of power to the at least one solid state light source responsive at least in part to the light condition signals from the photosensitive transducer; and
if not verified, controlling a supply of power to the at least one solid state light source according to a schedule.

19. The method of claim 18 wherein determining an expected time for at least a first daily event includes determining an expected time for a sunrise event and determining an expected time for at least a second daily event includes determining an expected time for a sunset event.

20. The method of claim 19 wherein the sunrise event is associated with a sunrise illumination level value indicative of a level of illumination in the ambient environment at the sunrise event and the sunset event is associated with a sunset illumination level value indicative of a level of illumination in the ambient environment at the sunset event.

21. The method of claim 19 wherein verifying whether a time of detection of the detected illumination condition that matches the first illumination condition is within a threshold of an expected time for the respective first daily event includes verifying whether the time of detection of the at least one light condition surpassing the sunrise illumination level value is within a defined threshold of an expected time for the sunrise event.

22. The method of claim 18, further comprising
verifying, by the controller, whether a duration of time between the time of detection of the illumination condition in the ambient environment that matches the first illumination condition and the time of detection of the illumination condition in the ambient environment that matches the second illumination condition within a defined threshold of an expected duration of time between the expected time for the first daily event and the expected time for the second daily event.

23. The method of claim 15, further comprising:
reading from a non-transitory processor-readable medium, a schedule of expected times of occurrence of the first daily event and at least a second daily event, the second daily event different from the first daily event, where the expected times of occurrence vary throughout a year.

24. The method of claim 23 wherein reading a schedule includes reading a year-long schedule which includes a respective expected sunset time and a respective expected sunrise time for each of a plurality of days.

25. The method of claim 24, further comprising:
calculating, by the controller, the respective expected sunset time and a respective expected sunrise time for each of a plurality of days; and
storing the calculated the respective expected sunset time and a respective expected sunrise time to non-transitory processor-readable medium.

26. The method of claim 15, further comprising:
communicating by the lamp control subsystem with one or more external devices from which the lamp control subsystem obtains data indicative of at least one of: a software update, a firmware update, one or more executable instruction sets, data indicative of a current date, data indicative of a current time, data indicative of an approximate longitude of the luminaire, or data indicative of an approximate latitude of the luminaire.

27. The method of claim 15, further comprising:
operating, by the lamp control subsystem, at least one solid state power switch coupled to the solid state light source.

28. The method of claim 27 wherein operating the at least one solid state power switch includes generates a pulse wave modulated signal responsive to the signals indicative of the at least one light condition sensed by the photosensitive transducer, and supplying the pulse wave modulated signal to the at least one solid state power switch to adjust a luminous output of the solid state light source.

* * * * *